(12) United States Patent
Maruyama

(10) Patent No.: US 11,493,710 B2
(45) Date of Patent: Nov. 8, 2022

(54) PLUGGABLE OPTICAL MODULE, OPTICAL COMMUNICATION SYSTEM, AND OPTICAL COMMUNICATION METHOD

(71) Applicant: NEC Corporation, Tokyo (JP)

(72) Inventor: Shinya Maruyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 64 days.

(21) Appl. No.: 16/981,926

(22) PCT Filed: Feb. 15, 2019

(86) PCT No.: PCT/JP2019/005699
§ 371 (c)(1),
(2) Date: Sep. 17, 2020

(87) PCT Pub. No.: WO2019/187759
PCT Pub. Date: Oct. 3, 2019

(65) Prior Publication Data
US 2021/0041648 A1  Feb. 11, 2021

(30) Foreign Application Priority Data

Mar. 27, 2018 (JP) .............................. JP2018-060527

(51) Int. Cl.
*G02B 6/42* (2006.01)
*G02F 1/225* (2006.01)
(Continued)

(52) U.S. Cl.
CPC ......... *G02B 6/4278* (2013.01); *G02F 1/2252* (2013.01); *H04B 10/07* (2013.01);
(Continued)

(58) Field of Classification Search
CPC .................................................. G02B 6/4278
See application file for complete search history.

(56) References Cited

U.S. PATENT DOCUMENTS 8,050,351 B2 * 11/2011 Cho .................. H04B 10/5053
375/295
8,643,929 B2 * 2/2014 Gill ....................... G02F 1/225
359/259
(Continued)

FOREIGN PATENT DOCUMENTS

EP  2169851 A2  3/2010
EP  2288055 A1  2/2011
(Continued)

OTHER PUBLICATIONS

Abe et al., SFF and SFP Optical Transceivers, Fujikura Technical Review, 2003 (Year: 2003).*
(Continued)

*Primary Examiner* — Peter Radkowski

(57) ABSTRACT

A pluggable optical module according to the present invention includes a pluggable electric connector configured so as to be insertable into and removable from an optical transmission apparatus, and capable of transmitting/receiving a data signal to/from the optical transmission apparatus, a drive unit configured to output first/second driving signals by amplifying the data signal, an optical signal output unit configured to output a first/second optical signal modulated according to the first/second drive signal, a light-intensity monitoring unit configured to monitor intensities of the first/second optical signals, a control unit configured to control a gain of the drive unit so as to adjust a difference between the intensities of the first/second optical signals based on a result of the monitoring by the light-intensity monitoring unit, and a pluggable optical receptor configured so that an optical fiber can be inserted thereinto and removed therefrom, and configured to output the first/second optical signals.

11 Claims, 19 Drawing Sheets

(51) Int. Cl.
    *H04B 10/07*     (2013.01)
    *H04B 10/516*     (2013.01)
    *H04J 14/06*     (2006.01)
    *G02F 1/21*     (2006.01)

(52) U.S. Cl.
    CPC .......... *H04B 10/5161* (2013.01); *H04J 14/06* (2013.01); *G02F 1/212* (2021.01)

(56) References Cited

U.S. PATENT DOCUMENTS

| | | | | |
|---|---|---|---|---|
| 9,195,079 | B2* | 11/2015 | Doerr | .................... G02F 1/0147 |
| 2007/0133918 | A1* | 6/2007 | Cho | .................... H04B 10/5057 |
| | | | | 385/1 |
| 2010/0080571 | A1 | 4/2010 | Akiyama et al. | |
| 2011/0170161 | A1* | 7/2011 | Gill | ........................ G02F 1/225 |
| | | | | 359/259 |
| 2012/0014470 | A1* | 1/2012 | Cho | .................... H04B 10/5057 |
| | | | | 375/279 |
| 2013/0209020 | A1* | 8/2013 | Doerr | ...................... G02F 1/011 |
| | | | | 385/2 |
| 2014/0307996 | A1 | 10/2014 | Kono | |
| 2015/0229406 | A1 | 8/2015 | Akiyama et al. | |
| 2017/0222725 | A1 | 8/2017 | Bhandare et al. | |
| 2018/0123720 | A1 | 5/2018 | Nomura | |
| 2018/0198531 | A1 | 7/2018 | Bhandare et al. | |

FOREIGN PATENT DOCUMENTS

| | | | |
|---|---|---|---|
| JP | 2008-092172 A | 4/2008 | |
| JP | 2010-81287 A | 4/2010 | |
| JP | 2014-206633 A | 10/2014 | |
| JP | 2016-72920 A | 5/2016 | |
| WO | WO-2011087940 A2 * | 7/2011 | ............ G02F 1/225 |
| WO | WO-2016/051800 A2 | 4/2016 | |
| WO | WO-2016/139886 A1 | 9/2016 | |
| WO | WO-2017/056350 A1 | 4/2017 | |
| WO | WO-2017/106057 A1 | 6/2017 | |

OTHER PUBLICATIONS

Chagnon et al.,"1 λ, 6 bits/symbol, 280 and 350 GB/s Direct Detection Transceiver using Intensity Modulation, Polarization Multiplexing, and Inter-Polarization Phase Modulation," in Optical Fiber Communication Conference Post Deadline Papers, OSA Technical Digest, 2015, paper Th5B.2. (Year: 2015).*

Kaiser et al., CL-TWE Mach-Zehnder Modulators on InP: Central Elements in Transmitter PICs of Increasing Complexity, ICTON 2017, We.B5.1 (Year: 2017).*

Chen et al., Use of polarization freedom beyond polarization division multiplexing to support high-speed and spectral-efficient data transmission, Light: Science & Applications (2017) 6, e16207 (Year: 2017).*

International Search Report corresponding to PCT/JP2019/005699, 2 pages, dated Apr. 16, 2019.

\* cited by examiner

Fig. 11

| AMPLITUDE OF DRIVING AMPLITUDE SIG1 (PEAK1) | INTENSITY OF OPTICAL SIGNAL LS1 (OPT1) |
|---|---|
| P11 | O11 |
| P12 | O12 |
| P13 | O13 |
| P14 | O14 |

| AMPLITUDE OF DRIVING AMPLITUDE SIG2 (PEAK2) | INTENSITY OF OPTICAL SIGNAL LS2 (OPT2) |
|---|---|
| P21 | O21 |
| P22 | O22 |
| P23 | O23 |
| P24 | O24 |

PLUGGABLE OPTICAL MODULE, OPTICAL COMMUNICATION SYSTEM, AND OPTICAL COMMUNICATION METHOD

CROSS-REFERENCE TO RELATED APPLICATIONS

This application is a national stage application of International Application No. PCT/JP2019/005699 entitled "PLUGGABLE OPTICAL MODULE, OPTICAL COMMUNICATION SYSTEM, AND OPTICAL COMMUNICATION METHOD," filed on Feb. 15, 2019, which claims the benefit of the priority of Japanese Patent Application No. 2018-060527 filed on Mar. 27, 2018, the disclosures of each of which are hereby incorporated by reference in their entirety.

TECHNICAL FIELD

The present invention relates to a pluggable optical module, an optical communication system, and an optical communication method.

BACKGROUND ART

An optical module that transmits and receives an optical signal is used in an optical communication system. The optical module includes an optical modulator, and drives the optical modulator by applying a drive signal according to a modulation method and thereby outputs a modulated optical signal.

Examples of known optical modules include a pluggable optical module which is used in an optical communication system in conformity with standards such as SFP (Small Form Factor Pluggable), XFP (10-Gigabit Small Form Factor Pluggable), and CFP (100 G Form-factor Pluggable). The pluggable optical module is configured so as to be insertable into and removable from an external optical transmission apparatus which serves as its host apparatus. Further, the pluggable optical module drives the optical modulator according to a data signal and a control signal received from the optical transmission apparatus, and thereby outputs a modulated optical signal.

The pluggable optical module is required to have a function of modulating an optical signal in various modulation methods according to the communication specifications of the optical transmission apparatus. Therefore, it is important to appropriately control the amplitude of the drive signal according to the data signal received from the optical transmission apparatus in order to improve the communication quality. As a technique for controlling the amplitude of a drive signal, for example, Patent Literature 1 discloses a configuration for controlling the amplitude of a drive signal so that an optical output from an optical modulator is maximized. Further, Patent Literature 2 discloses a configuration for controlling the amplitude of a drive signal in order to output an optical signal that accurately conforms to a data signal.

CITATION LIST

Patent Literature

Patent Literature 1: Japanese Unexamined Patent Application Publication No. 2008-092172

Patent Literature 2: WO2017/056350

SUMMARY OF INVENTION

Technical Problem

In an optical communication system, an optical modulation method that enables high-speed transmission is used in order to cope with the increasing demand for data traffic. As such an optical modulation method, QPSK (Quadrature Phase Shift Keying) and 16 QAM (Quadrature Amplitude Modulation) have been known.

An optical module that adopts the above-described optical modulation method outputs a plurality of optical signals that are modulated according to data signals received from an optical transmission apparatus. For example, in the QPSK method, an optical signal in which an optical signal having an in-phase (In-phase) component and an optical signal having a quadrature (Quadrature) component are multiplexed is output. The optical module includes a plurality of optical modulators corresponding to the respective optical signals, and outputs these optical signals by applying drive signals, which are obtained by amplifying data signals, to the respective optical modulators.

In order to realize a multilevel modulation method, it is necessary to precisely perform waveform processing for compensating a high-frequency characteristic of a drive signal for each of the drive signals applied to the respective optical modulators. In this case, since the amplitudes of the drive signals applied to the respective optical modulators are different from each other, a difference between light intensities of the optical signals output from the respective optical modulators increase. Further, recently, an individual difference of a modulation curve (a transfer curve) of a semiconductor modulator that is used to reduce the size of an optical module is large. The linearity of the modulation curve of an optical modulator affects the intensity of an optical signal output from that optical modulator. Therefore, in an optical module using semiconductor modulators, a difference between light intensities of the respective optical signals increases.

When the difference between the light intensities of the respective optical signals increases for the above-described reason, the signal quality deteriorates. Therefore, it is necessary to adjust the difference between the light intensities of the respective optical signals in order to maintain the signal quality. However, this problem cannot be solved by the techniques disclosed in Patent Literatures 1 and 2.

The present invention has been made in view of the above-described circumstances, and provides a pluggable optical module, an optical communication system, and an optical communication method capable of eliminating a difference between intensities of optical signals each of which is output from a respective one of a plurality of optical modulators.

Solution to Problem

A pluggable optical module according to the present invention includes: a pluggable electric connector configured so as to be insertable into and removable from an optical transmission apparatus, and capable of transmitting/receiving a data signal to/from the optical transmission apparatus; a drive unit configured to output first and second driving signals by amplifying the data signal; an optical signal output unit configured to output a first optical signal modulated according to the first drive signal and a second optical signal modulated according to the second drive signal; a light-intensity monitoring unit configured to monitor intensities of the first and second optical signals; a control unit configured to control a gain of the drive unit so as to adjust a difference between the intensities of the first and second optical signals based on a result of the monitoring by the light-intensity monitoring unit; and a pluggable optical receptor configured so that an optical fiber can be inserted thereinto and removed therefrom, and configured to output the first and second optical signals.

An optical communication system according to the present invention includes: an optical fiber configured to transmit an optical signal; a pluggable optical module configured so that the optical fiber can be inserted thereinto and removed therefrom, and configured to output the optical signal to the optical fiber; and an optical transmission apparatus configured so that the pluggable optical module can be inserted thereinto and removed therefrom, and configured to control the pluggable optical module, in which the pluggable optical module includes: a pluggable electric connector configured so as to be insertable into and removable from an optical transmission apparatus, and capable of transmitting/receiving a data signal to/from the optical transmission apparatus; a drive unit configured to output first and second driving signals by amplifying the data signal; an optical signal output unit configured to output a first optical signal modulated according to the first drive signal and a second optical signal modulated according to the second drive signal; a light-intensity monitoring unit configured to monitor intensities of the first and second optical signals; a control unit configured to control a gain of the drive unit so as to adjust a difference between the intensities of the first and second optical signals based on a result of the monitoring by the light-intensity monitoring unit; and a pluggable optical receptor configured so that an optical fiber can be inserted thereinto and removed therefrom, and configured to output the first and second optical signals.

An optical communication method according to the present invention includes: transmitting/receiving a data signal to/from an optical transmission apparatus through a pluggable electric connector, the pluggable electric connector being configured so as to be insertable into and removable from the optical transmission apparatus; outputting first and second driving signals by amplifying the data signal; outputting a first optical signal modulated according to the first drive signal and a second optical signal modulated according to the second drive signal; outputting a result of monitoring of intensities of the first and second optical signals; controlling an amplification gain of the data signal so as to adjust a difference between the intensities of the first and second optical signals based on the result of the monitoring; and outputting the first and second optical signals through a pluggable optical receptor, the pluggable optical receptor being configured so that an optical fiber can be inserted thereinto and removed therefrom.

Advantageous Effects of Invention

According to the present invention, it is possible to provide a pluggable optical module, an optical communication system, and an optical communication method capable of adjusting a difference between intensities of a plurality of optical signals to be output.

BRIEF DESCRIPTION OF DRAWINGS

FIG. 11 shows an example of a structure of memorized information stored in a storage unit according to the third example embodiment;

DESCRIPTION OF EMBODIMENTS

Next, example embodiments according to the present invention will be described in detail with reference to the drawings.

First Example Embodiment

Figure 1:
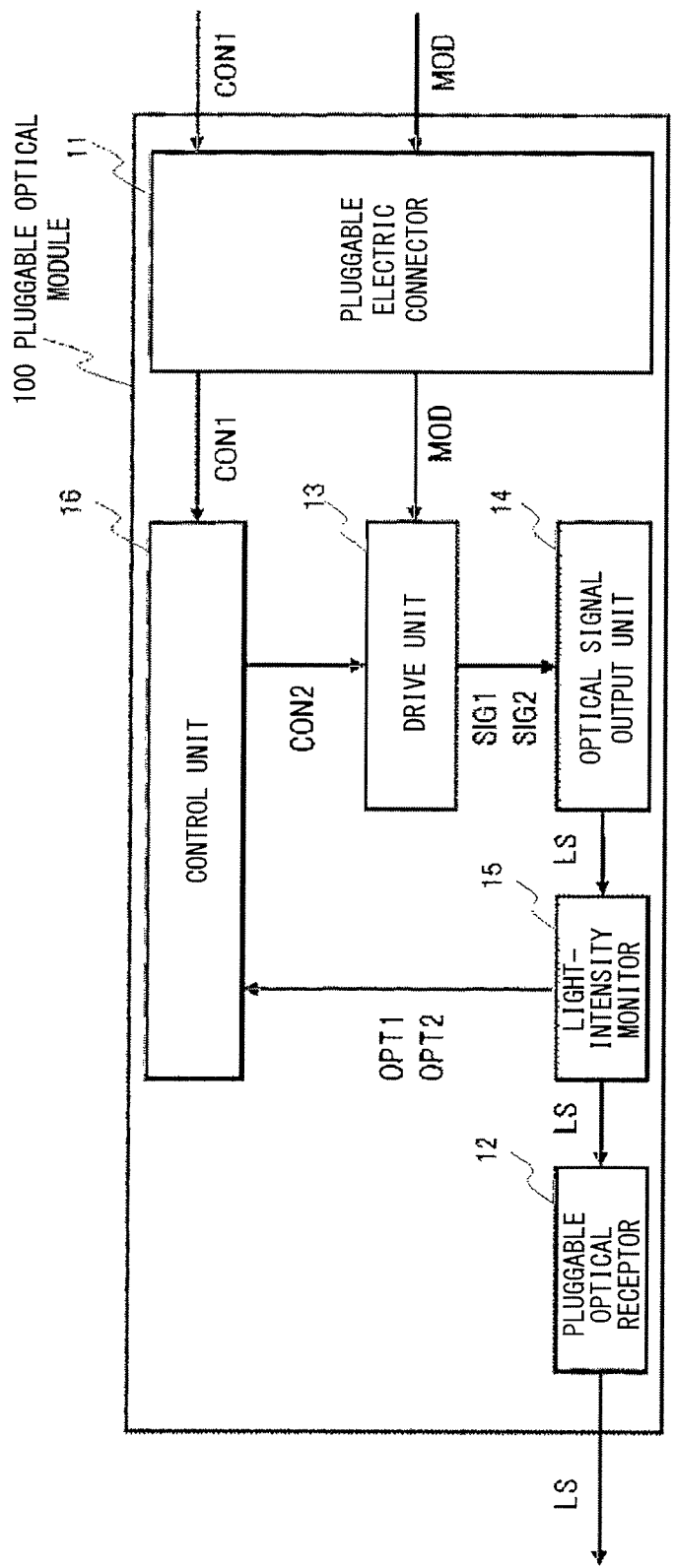
FIG. 1 shows an example of a configuration of a pluggable optical module according to a first example embodiment.
Figure 2:
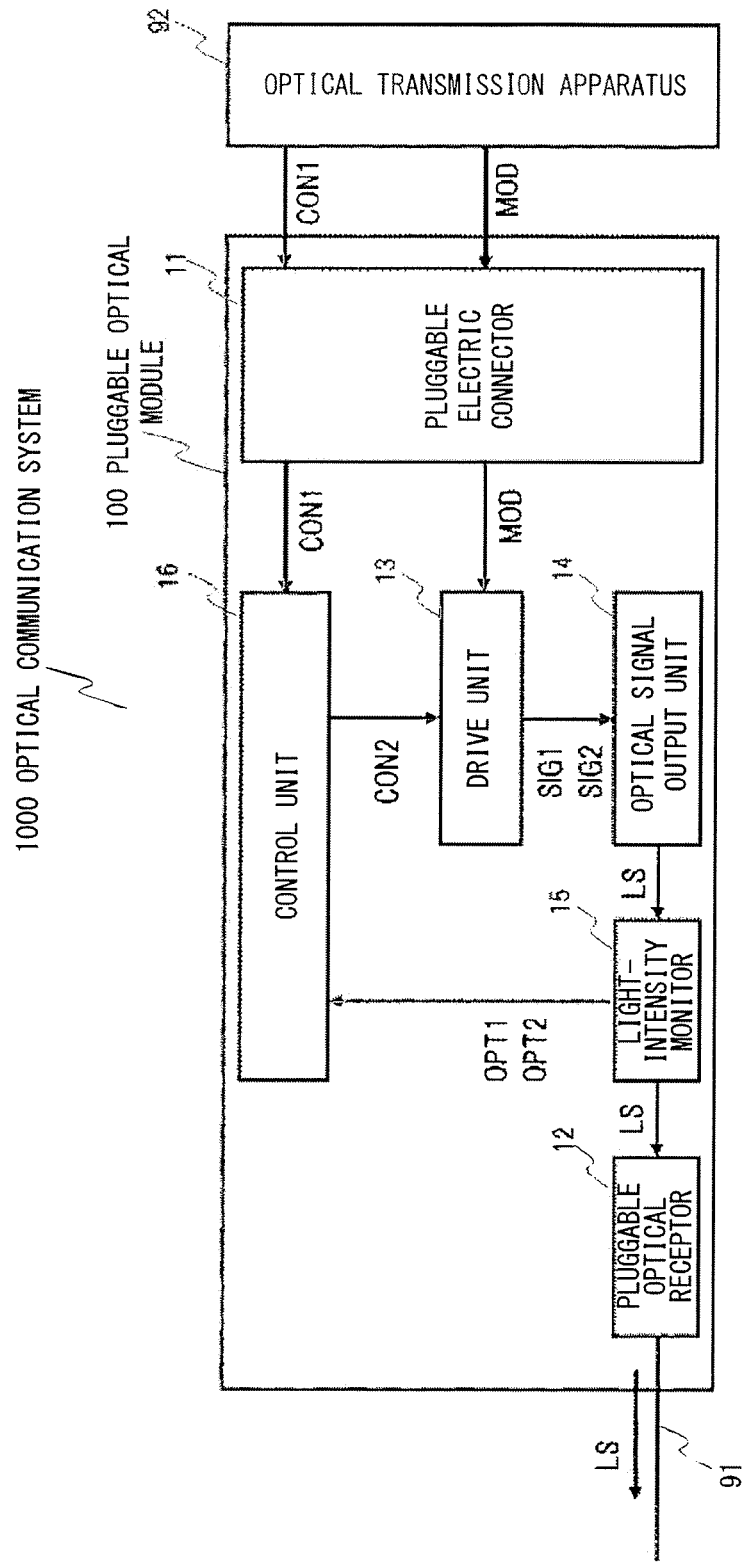
FIG. 2 shows an example of a configuration of an optical communication system according to the first example embodiment.

FIG. 1 shows an example of a configuration of a pluggable optical module 100 according to a first example embodiment of the present invention. The pluggable optical module 100 shown in FIG. 1 includes a pluggable electric connector 11, a pluggable optical receptor 12, a drive unit 13, an optical signal output unit 14, a light-intensity monitor 15, and a control unit 16. Further, FIG. 2 shows an example of a configuration of an optical communication system 1000 according to the first example embodiment of the present invention. The optical communication system 1000 shown in FIG. 2 includes the pluggable optical module 100, an optical fiber 91, and an optical transmission apparatus 92. Further, as shown in FIG. 2, the pluggable optical module 100 is configured so as to be insertable into and removable from the optical fiber 91 and the optical transmission apparatus 92.

The pluggable electric connector 11 is configured so as to be insertable into and removable from the optical transmission apparatus 92. The pluggable electric connector 11 outputs a control signal CON1, which is an electric signal received from the optical transmission apparatus 92, to the control unit 16. Further, the pluggable electric connector 11 outputs a modulation signal MOD, which is an electric signal received from the optical transmission apparatus 92, to the drive unit 13. Further, although not shown in the drawings, the pluggable electric connector 11 may be capable of outputting an electric signal output from the controller 16 to the optical transmission apparatus 92.

The pluggable optical receptor 12 is configured so as to be insertable into and removable from the optical fiber 91. The optical fiber 91 may be equipped with a connector. In this case, the pluggable optical receptor 12 is formed so that its shape conforms to the shape of an optical fiber connector such as an LC-type connector or an MU-type connector. Further, the pluggable optical receptor 12 outputs an optical signal LS output from the optical signal output unit 14 to the optical fiber 91.

Figure 3:
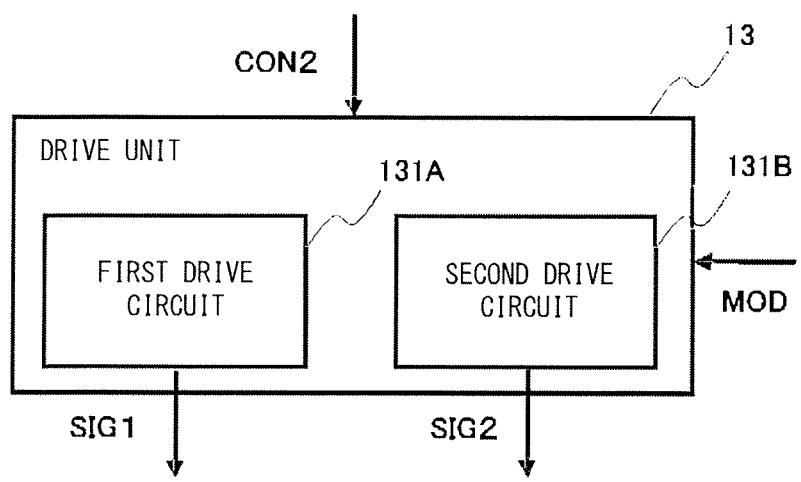
FIG. 3 is a sequence diagram showing an example of a configuration of a drive unit according to the first example embodiment.

The drive unit 13 has a function of outputting, to the optical signal output unit 14, drive signals SIG1 and SIG2 which are obtained by amplifying the modulation signal MOD received from the optical transmission apparatus 92 through the pluggable electric connector 11. FIG. 3 shows an example of a configuration of the drive unit 13. The drive unit 13 includes a first drive circuit 131A and a second drive circuit 131B. The first drive circuit 131A outputs the drive signal SIG1 by amplifying the modulation signal MOD. Further, the second drive circuit 131B outputs the drive signal SIG2 by amplifying the modulation signal MOD. Note that the drive signals SIG1 and SIG2 may be signals having signal components conforming to the respective optical modulation methods.

The drive unit 13 is further configured so that its gain, by which the modulation signal MOD is amplified, can be adjusted. Specifically, the drive unit 13 is configured so that its gain by which the modulation signal MOD is amplified in order to output the drive signal SIG1 can be adjusted, and its gain by which the modulation signal MOD is amplified in order to output the drive signal SIG2 can also be adjusted. Further, the amplitudes of the drive signals SIG1 and SIG2 are adjusted by adjusting the respective gains. The adjustments of the gains are carried out by controlling the first and second drive circuits 131A and 131B. By adjusting the respective gain, the drive unit 13 can adjust each of the amplitudes of the drive signals SIG1 and SIG2. Further, the drive unit 13 adjusts the gains based on the control signal CON2 received from the control unit 16, and the control performed by the control unit 16 will be described later.

The optical signal output unit 14 outputs optical signals LS1 and LS2 to the pluggable optical receptor 12 in the form of multiplexed light LS. Note that the optical signal LS1 is an optical signal that has been modulated according to the drive signal SIG1 received from the drive unit 13, and the optical signal LS2 is an optical signal that has been modulated according to the drive signal SIG2 received from the drive unit 13. The method for modulating the optical signals LS1 and LS2 may be any of various modulation methods such as a phase modulation, an amplitude modulation, and a polarization modulation, or may be a modulation method in which two or more of such various modulation methods are combined.

Figure 4:
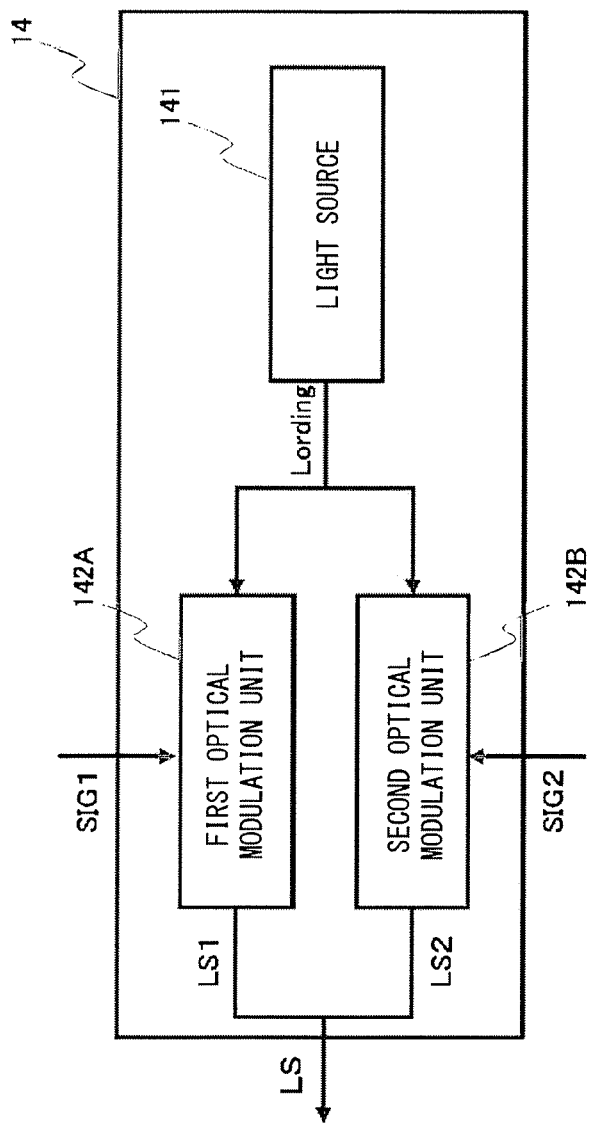
FIG. 4 shows an example of a configuration of an optical signal output unit according to the first example embodiment.

FIG. 4 shows an example of a configuration of the optical signal output unit 14. The optical signal output unit 14 shown in FIG. 4 includes a light source 141, a first optical modulation unit 142A, and a second optical modulation unit 142B. Hereinafter, when the first and second optical modulation units 142A and 142B are not distinguished from each other, they are referred to as optical modulation units 142.

The light source 141 outputs output light "Lording". Note that the light source 141 may be, for example, a wavelength-variable optical module composed of a semiconductor element and a ring resonator. In this case, the light source 141 may be able to change the wavelength of the output light "Lording" under the control of the control unit 16.

The optical modulation unit 142 includes at least one Mach-Zehnder type optical modulator, and outputs an optical signal modulated by a predetermined modulation method. Note that the Mach-Zehnder type optical modulator may be a semiconductor optical modulator. Further, the first and second optical modulation units 142A and 142B may be provided as Inner Mach-Zehnder type optical modulators, and the Mach-Zehnder type optical modulator with the first and second optical modulation units 142A and 142B disposed on its arms may be provided as Outer Mach-Zehnder type optical modulator.

The optical modulation unit 142 has a phase modulation area formed on the optical waveguide of the Mach-Zehnder type optical modulator, and can output an optical modulation signal according to the drive signal applied to the phase modulation area by the drive unit 13. The first optical modulation unit 142A outputs an optical signal LS1 that has been modulated according to the drive signal SIG1. Further, the second optical modulation unit 142B outputs an optical signal LS2 that has been modulated according to the drive signal SIG2.

Note that the phase modulation area is an area in which an electrode is formed on the optical waveguide. When the drive signal is applied to the electrode, the effective refractive index of the optical waveguide under the electrode changes. As a result, it is possible to change the substantial length of the optical path of the optical waveguide in the phase modulation area. In this way, the phase modulation area can change the phase of the optical signal propagating through the optical waveguide. Further, it is possible to bring about a phase difference between the optical signals propagating through the two optical waveguides and thereby to modulate the optical signal. Further, the intensity of the output optical signal changes according to the amplitude of the drive signal applied to the phase modulation area.

Note that when the optical signal output unit 14 is configured so that it can output an optical signal modulated by an optical modulation method such as a QPSK method or a 16 QAM method, the optical signal LS1 may be a signal corresponding to the I-axis component of the constellation and the optical signal LS2 may be a signal corresponding to the Q-axis component of the constellation.

Further, although not shown in the drawings, a bias voltage is applied to the phase modulation area of the optical modulation unit 142. The bias voltage is set to an optimum value according to the modulation method. For example, it is assumed that the first and second optical modulation units 142A and 142B are provided as Inner Mach-Zehnder type optical modulators, and the Mach-Zehnder type optical modulator with the first and second optical modulation units 142A and 142B disposed on its arms is provided as Outer Mach-Zehnder type optical modulator. In this case, a bias voltage (null) with which the optical output in the modulation curve is minimized is applied to the first and second optical modulation units 142A and 142B, which are the Inner Mach-Zehnder type optical modulators. Further, a bias voltage (quad) with which the phases of the optical signals input to the first and second optical modulation units 142A and 142B are made orthogonal to each other is applied to the Outer Mach-Zehnder type optical modulators.

The light-intensity monitor 15 monitors the light intensities of the optical modulation signals LS1 and LS2 output from the optical signal output unit 14. Further, the light-intensity monitor 15 outputs a monitoring result OPT1 of the light modulation signal LS1 and a monitoring result OPT2 of the light modulation signal LS2 to the control unit 16. Note that the light-intensity monitor 15 may be formed as a TAP photodiode.

Figure 5:
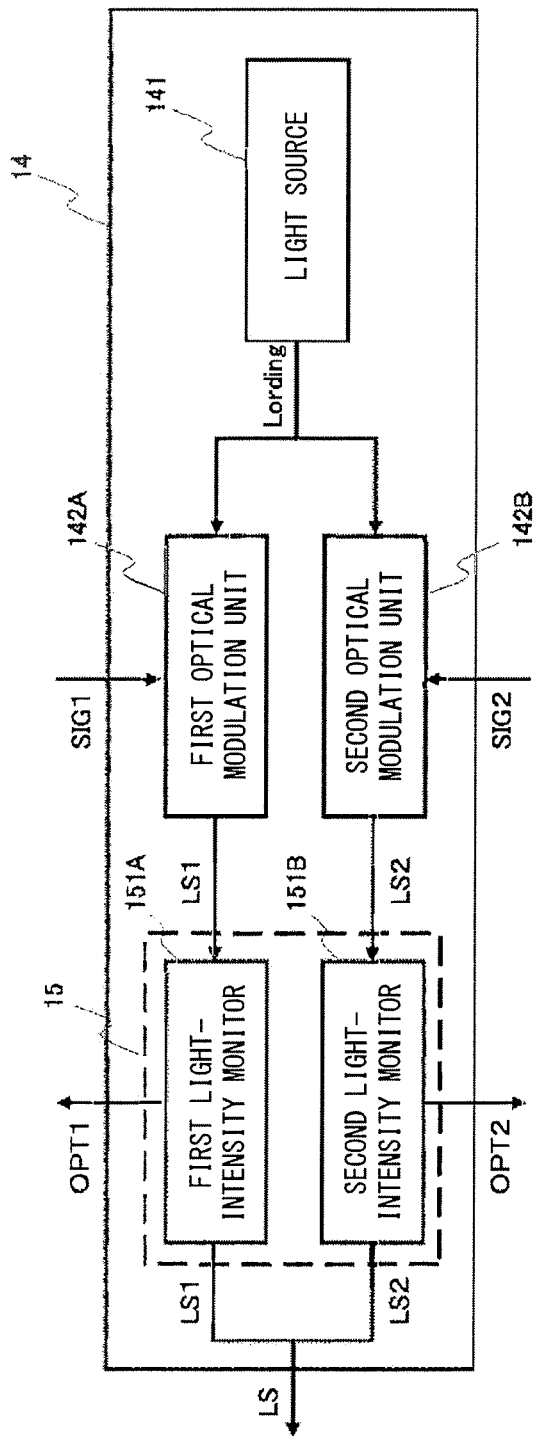
FIG. 5 shows an example of a configuration of a light-intensity monitor according to the first example embodiment.
Figure 6:
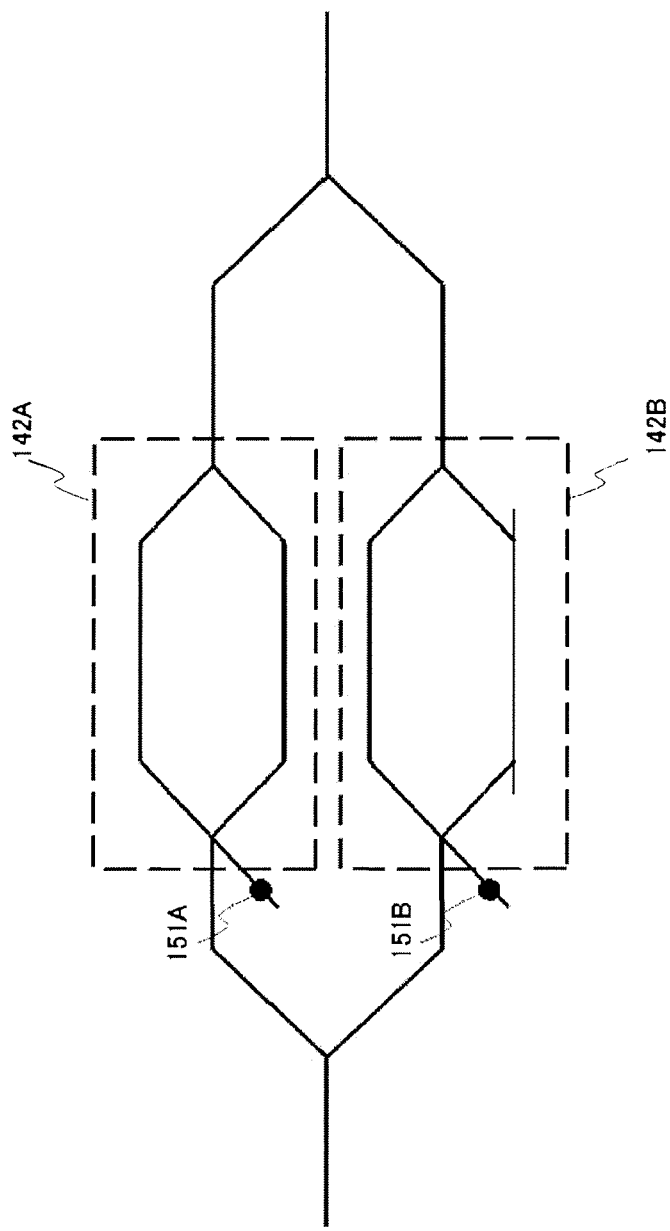
FIG. 6 shows an example of a configuration of a first light-intensity monitor and a second light-intensity monitor according to the first example embodiment.

The place where the light-intensity monitor 15 is disposed is not limited to the place where the multiplexed light transmitted from the optical signal output unit 14 is input. FIG. 5 shows an example of a configuration in which the light-intensity monitor 15 is included inside the optical signal output unit 14. The light-intensity monitor 15 shown in FIG. 5 includes a first light-intensity monitor 151A and a second light-intensity monitor 151B. The first light-intensity monitor 151A is disposed at a place where the optical signal LS1 sent from the first optical modulation unit 142A is input. The second light-intensity monitor 151B is disposed at a place where the optical signal LS2 sent from the second light modulation unit 142B is input. Further, the first light-intensity monitor 151A outputs the monitoring result OPT1 to the control unit 16, and the second light-intensity monitor 151B outputs the monitoring result OPT2 to the control unit 16. Further, FIG. 6 shows an example of a configuration of the first and second light-intensity monitors. As shown in FIG. 6, the first and second light-intensity monitors 151A and 151B may be provided as TAP photodiodes on the optical waveguides of the Mach-Zehnder type optical modulators.

The control unit 16 controls the gain of the drive unit 13 so as to adjust the difference between the intensities of the optical signals LS1 and LS2 based on the monitoring results OPT1 and OPT2 of the light-intensity monitor 15. More specifically, the control unit 16 can adjust the amplitude of the drive signal SIG1 by adjusting the gain by which the drive unit 13 amplifies the modulation signal MOD to output the drive signal SIG1 according to the control signal CON2. Further, the control unit 16 can adjust the amplitude of the drive signal SIG2 by adjusting the gain by which the drive unit 13 amplifies the modulation signal MOD to output the drive signal SIG2 according to the control signal CON2. The intensities of the optical signals LS1 and LS2 change according to the amplitudes of the drive signals SIG1 and SIG2, so that, as a result, the control unit 16 can adjust the intensities of the optical signals LS1 and LS2 by controlling the gain of the drive unit 13.

Further, the control unit 16 adjusts the intensities of the optical signals LS1 and LS2 so that the difference between the intensities of the optical signals LS1 and LS2 decreases. In this way, the imbalance between the intensities of the optical signals LS1 and LS2 is eliminated, thus making it possible to improve the signal quality.

Figure 7:
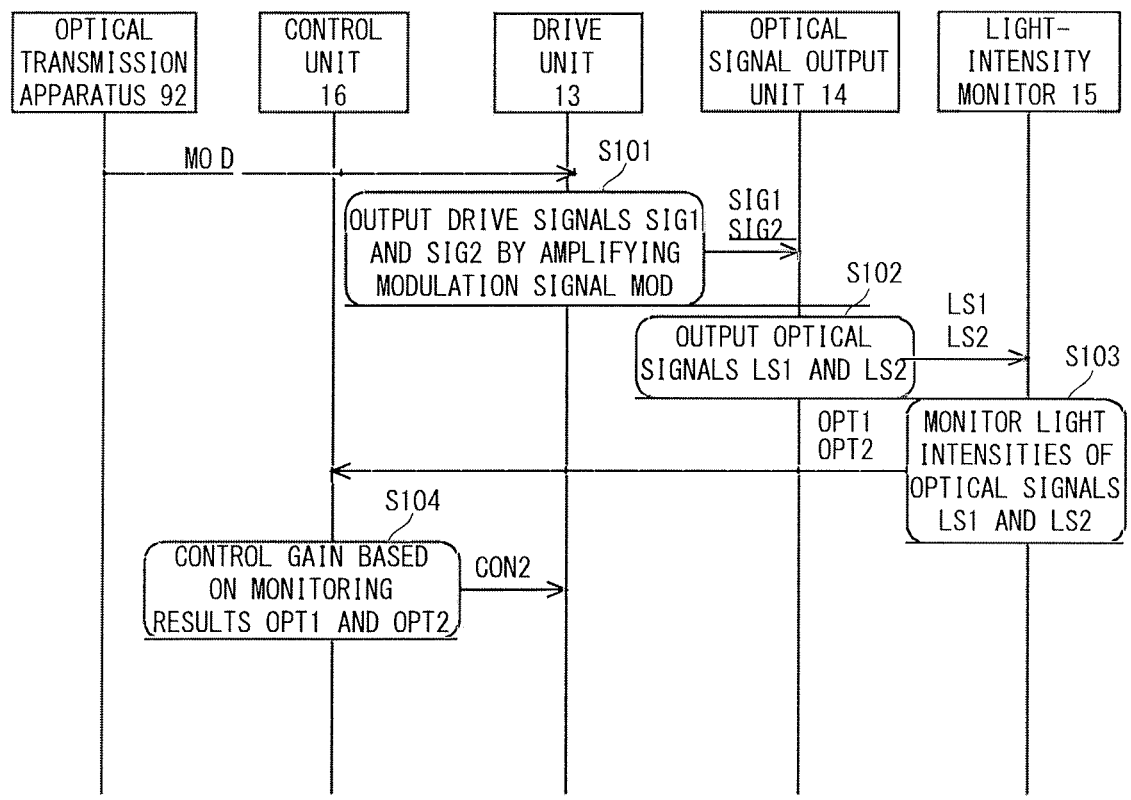
FIG. 7 is a sequence diagram showing an example of operations performed by each component of the pluggable optical module according to the first example embodiment.

A method for controlling the gain of the drive unit 13 in order to adjust the difference between the intensities of the optical signals LS1 and LS2 in the pluggable optical module 100 will be described. FIG. 7 is a sequence diagram showing an example of operations performed by each component of the pluggable optical module 100.

The drive unit 13 outputs the drive signals SIG1 and SIG2 by amplifying the modulation signal MOD received from the optical transmission apparatus 92 (S101). Note that the drive unit 13 amplifies the modulation signal MOD by a predetermined gain value. Further, the predetermined gain value may be set in advance by the control unit 16.

The optical signal output unit 14 outputs the optical signal LS1 modulated according to the drive signal SIG1 and the optical signal LS2 modulated according to the drive signal SIG2 (S102).

The light-intensity monitor 15 monitors the light intensities of the optical signals LS1 and LS2 (S103). Further, the light-intensity monitor 15 outputs monitoring results OPT1 and OPT2.

The control unit 16 controls the gain of the drive unit 13 based on the monitoring results OPT1 and OPT2 (S104). More specifically, the control unit 16 controls the gain of the drive unit 13 according to the control signal CON2 so as to adjust the difference between the light intensities of the optical signals LS1 and LS2.

A method by which the control unit 16 adjusts the difference between the light intensities of the optical signals LS1 and LS2 will be described. The control unit 16 may control the gain of the drive unit 13 so that the monitoring results OPT1 and OPT2 become equal to each other. Alternatively, the control unit 16 may set a predetermined target value OPT_TGT for the light intensity, and control the gain of the drive unit 13 so that each of the monitoring results OPT1 and OPT2 becomes equal to the target value OPT_TGT. In this case, the control unit 16 may set the target value OPT_TGT based on the control signal CON1 received from the optical transmission apparatus 92.

Note that the drive unit 13 amplifies the modulation signal MOD by the gain controlled by the control unit 16, so that the amplitudes of the driving amplitudes SIG1 and SIG2 change. In this process, the light intensities of the optical signals LS1 and LS2 also change, and the monitoring results OPT1 and OPT2 also change. The control unit 16 may further control the gain of the drive unit 13 based on the changed monitoring results OPT1 and OPT2.

As described above, the pluggable optical module according to this example embodiment monitors the intensities of optical signals, and adjusts the difference between the intensities of the optical signals by controlling the gain of the drive unit based on the monitoring results. Since the difference between the light intensities is eliminated by controlling the gain, the signal quality can be improved.

Note that the control unit 16 may adjust the intensity of the optical signal LS2 after adjusting the intensity of the optical signal LS1. In this case, for example, the control unit 16 controls the drive unit 13 so as to shut off the output of the drive signal SIG2 and to output the drive signal SIG1. The monitoring result OPT1 of the optical signal LS1 is output from the light-intensity monitor 15, and the control unit 16 controls the gain of the driving unit 13 based on the monitoring result OPT1. Next, the control unit 16 controls the drive unit 13 so as to shut off the output of the drive signal SIG1 and to output the drive signal SIG2. By doing so, the control unit 16 controls the gain of the drive unit 13 based on the monitoring result OPT2. By separately controlling the optical signals LS1 and LS2, it is possible to reduce the influence of noises and thereby to perform the control based on accurate monitoring results.

Second Example Embodiment

A second example embodiment according to the present invention will be described. A pluggable optical module according to the second example embodiment monitors the amplitudes of drive signals and the intensities of optical signals while associating them with each other, and adjusts the difference between the intensities of the optical signals by controlling the gain of a drive unit based on the values of the amplitudes of the drive signals.

Figure 8:
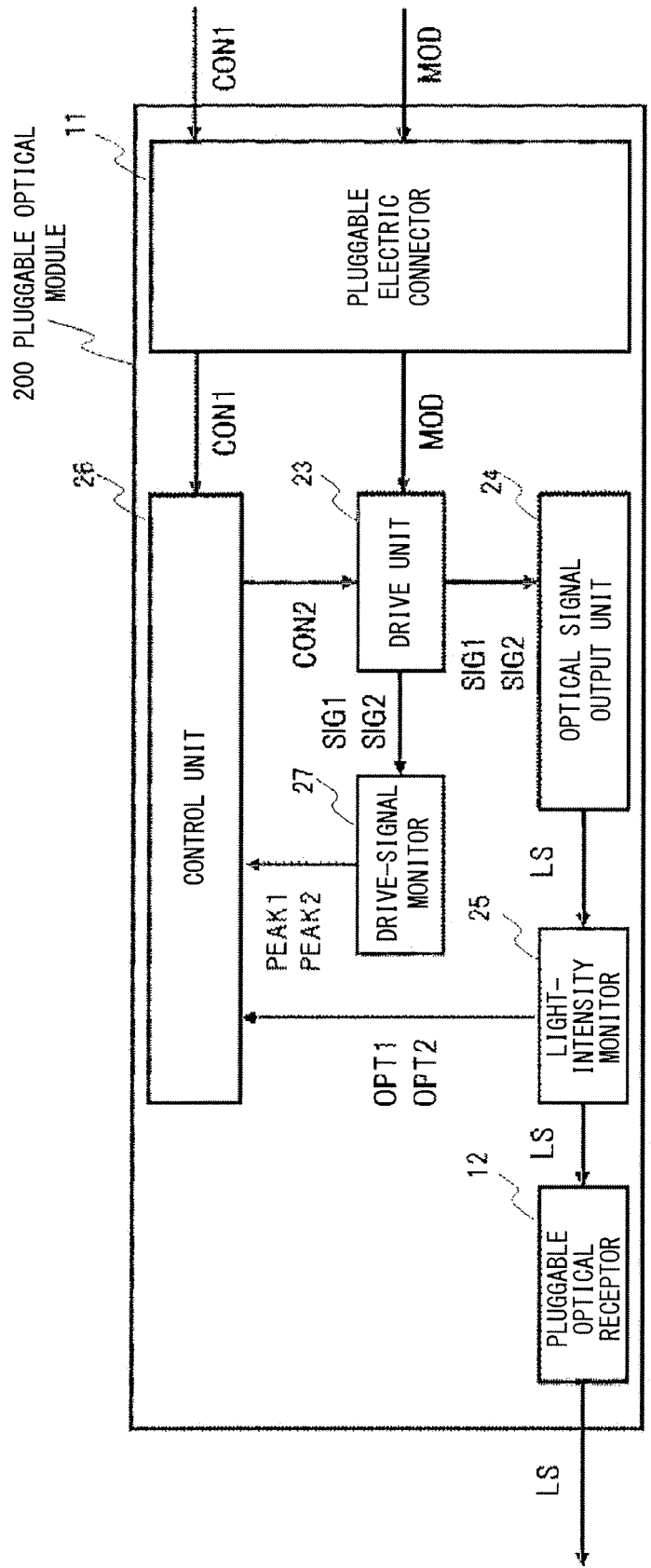
FIG. 8 shows an example of a configuration of a pluggable optical module according to a second example embodiment.

FIG. 8 shows an example of a configuration of a pluggable optical module 200 according to the second example embodiment of the present invention. Note that in the second example embodiment according to the present invention, descriptions of components/structures similar to those in the first example embodiment according to the present invention are omitted.

A drive-signal monitor 27 monitors the amplitudes of drive signals. Drive signals SIG1 and SIG2 are input from a drive unit 23 to the drive-signal monitor 27. The drive-signal monitor 27 monitors the amplitudes of the drive signals SIG1 and SIG2. The drive-signal monitor 27 outputs a monitoring result PEAK1 of the amplitude of the drive signal SIG1 and a monitoring result PEAK2 of the amplitude of the drive signal SIG2 to a control unit 26.

The control unit 26 controls the gain of the drive unit 23 based on the monitoring results PEAK1 and PEAK2 sent from the drive-signal monitor 17. Specifically, the control unit 26 sets target values PEAK1_TGT and PEAK2_TGT for the amplitudes of the drive signals SIG1 and SIG2, and compares the monitoring results PEAK1 and PEAK2 with the target values PEAK1_TGT and PEAK2_TGT, respectively. The control unit 26 controls the gain of the drive unit 23 so that the monitoring results PEAK1 and PEAK2 become equal to the target values PEAK1_OPT and PEAK2_OPT, respectively.

The control unit 26 defines the target values PEAK1_TGT and PEAK2_TGT for the driving amplitudes as the values of the amplitudes of the drive signals SIG1 and SIG2 with which the light intensities of the optical signals LS1 and LS2 become equal to each other. Since the control unit 26 receives the monitoring results from the light-intensity monitor 25 and the drive signal monitor 27, the control unit 26 can refer to the monitoring results OPT1 and OPT2 and the monitoring results PEAK1 and PEAK2 while associating them with each other. Therefore, the control unit 26 can set the monitoring results PEAK1 and PEAK2 in the state where the monitoring results OPT1 and OPT2 are equal to each other as the target values PEAK1_TGT and PEAK2_TGT, respectively. As described above in the first example embodiment, when the target value OPT_TGT for the light intensity is set, the monitoring results PEAK1 and PEAK2 in the state where each of the monitoring results OPT1 and OPT2 indicates the target value OPT_TGT can be set as the target values PEAK1_TGT and PEAK2_TGT, respectively.

Figure 9:
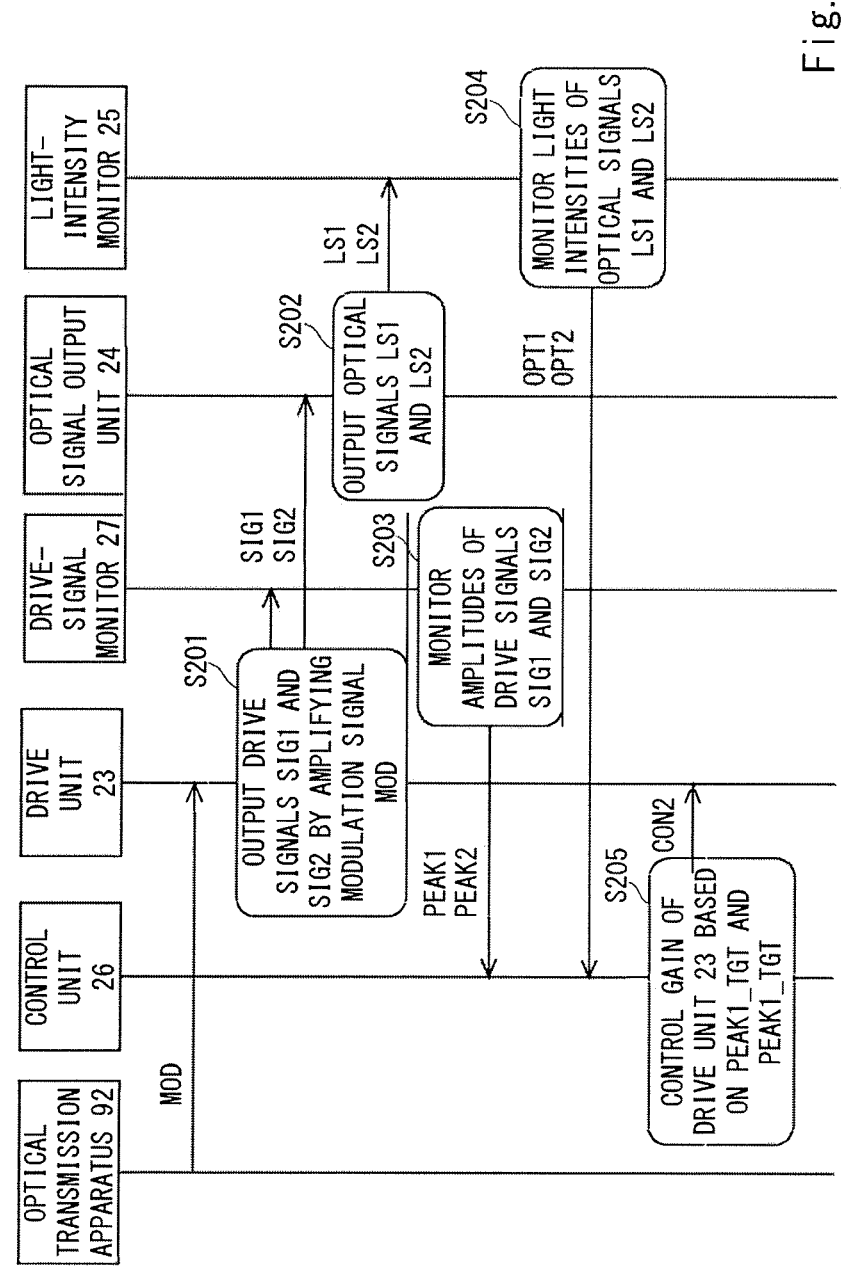
FIG. 9 is a sequence diagram showing an example of operations performed by each component of the pluggable optical module according to the second example embodiment.

Next, a procedure through which the control unit 26 controls the gain of the drive unit 23 will be described. FIG. 9 is a sequence diagram showing an example of operations performed by each component of the pluggable optical module 200.

The drive unit 23 outputs drive signals SIG1 and SIG2 by amplifying a modulation signal MOD received from the optical transmission apparatus 92 (S201).

The optical signal output unit 24 outputs an optical signal LS1 that has been modulated according to the drive signal SIG1 and an optical signal LS2 that has been modulated according to the drive signal SIG2 (S202).

The drive-signal monitor 27 outputs monitoring results PEAK1 and PEAK2 of the amplitudes of the drive signals SIG1 and SIG2 (S203).

The light-intensity monitor 25 outputs monitoring results OPT1 and OPT2 of the light intensities of the optical signals LS1 and LS2 (S204).

The control unit 26 controls the gain of the drive unit 23 based on the target values PEAK1_TGT and the PEAK2_TGT (S205). Specifically, the control unit 26 changes the amplitude of the drive signal SIG1 by controlling the gain of the drive unit 23, and thereby controls the value of the monitoring result PEAK1 so as to become equal to the target value PEAK1_TGT. Further, the control unit 26 changes the amplitude of the drive signal SIG2 by controlling the gain of the drive unit 23, and thereby controls the value of the monitoring result PEAK2 so as to become equal to the target value PEAK2_TGT. Further, as described above, the target values PEAK1_TGT and the PEAK2_TGT are set based on the monitoring results OPT1, OPT2, PEAK1 and PEAK2.

Note that the control of the gain of the drive unit 23 performed by the control unit 26 is not limited to the control that is performed at the time of the calibration, and may be performed when the pluggable optical module 200 is performing optical communication.

The pluggable optical module according to this example embodiment monitors the intensities of optical signals and the amplitudes of drive signals while associating them with each other, and adjusts the difference between the intensities of the optical signals by controlling the gain of the drive unit based on the values of the amplitudes of the drive signals. Since the difference between the intensities of the optical signals output from the optical signal output unit is eliminated, the signal quality can be improved.

Third Example Embodiment

Configuration

A third example embodiment according to the present invention will be described. A pluggable optical module 300 according to the third example embodiment has a configuration in which memorized information associating intensities of optical signals with monitoring results of amplitudes of drive signals is held (i.e., stored). Further, the pluggable optical module 300 controls the gain of the drive unit based on a control signal received from the optical transmission apparatus and the memorized information.

Figure 10:
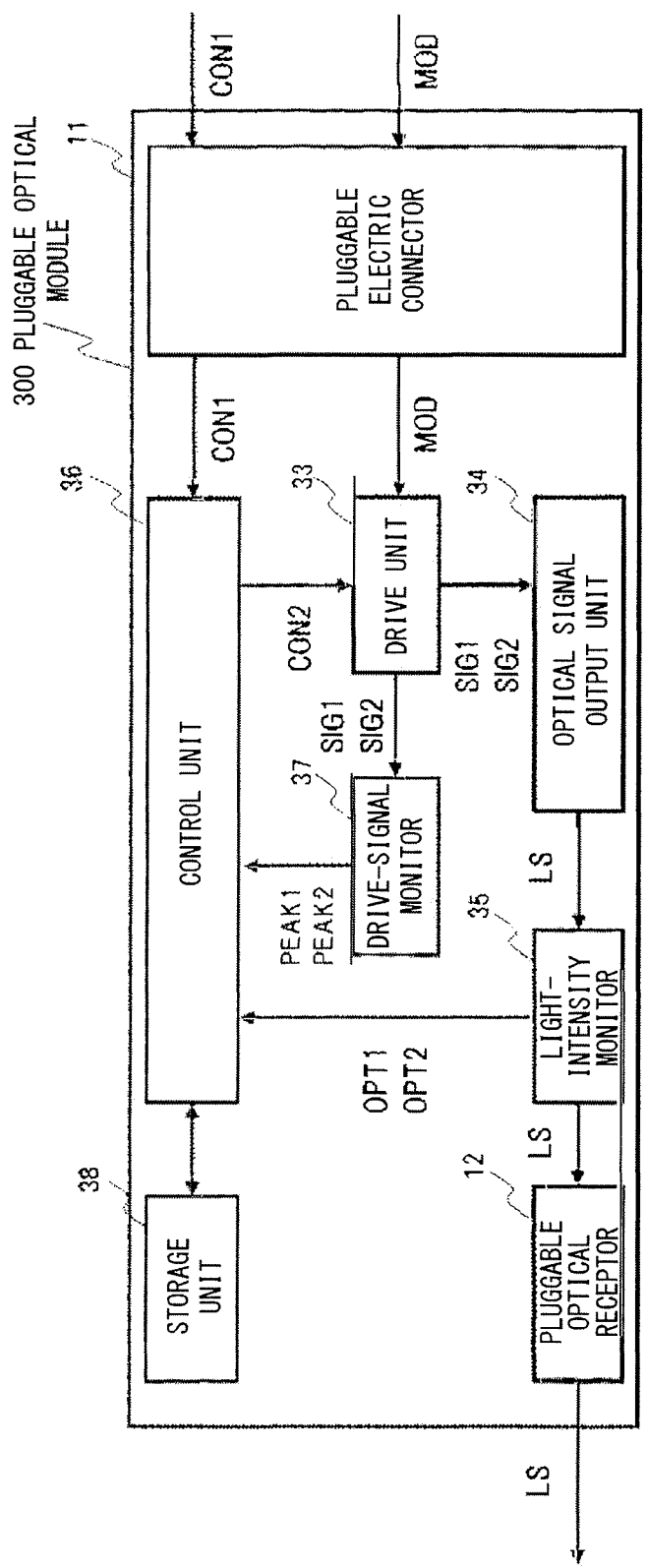
FIG. 10 shows an example of a configuration of a pluggable optical module according to a third example embodiment.

The third example embodiment according to the present invention will be described. FIG. 10 shows an example of a configuration of the pluggable optical module 300 according to the third example embodiment of the present invention. Note that in the third example embodiment according to the present invention, descriptions of components/structures similar to those in the other example embodiments according to the present invention are omitted.

A control unit 36 stores monitoring results OPT1 and OPT2 received from a light-intensity monitor 35 and monitoring results PEAK1 and PEAK2 received from a drive-signal monitor 37 into a storage unit 38. Further, the control unit 36 controls the gain of a drive unit 33 by referring to a control signal CON1 received from the optical transmission apparatus 92 and memorized information stored in the storage unit 38. Details will be described later.

The storage unit 38 holds the monitoring results stored by the control unit 36 as memorized information. The storage unit 38 stores the monitoring results PEAK1 and OPT1 while associating them with each other, and stores the monitoring results PEAK2 and OPT2 while associating them with each other. FIG. 11 shows an example of a structure of the memorized information stored in the storage unit 38. The storage unit 38 holds a table in which the monitoring results PEAK1 and OPT1 are associated with each other and a table in which the monitoring results PEAK2 and OPT2 are associated with each other. Note that the values in each of the tables may be stored in the form of bit values.

Figure 12:
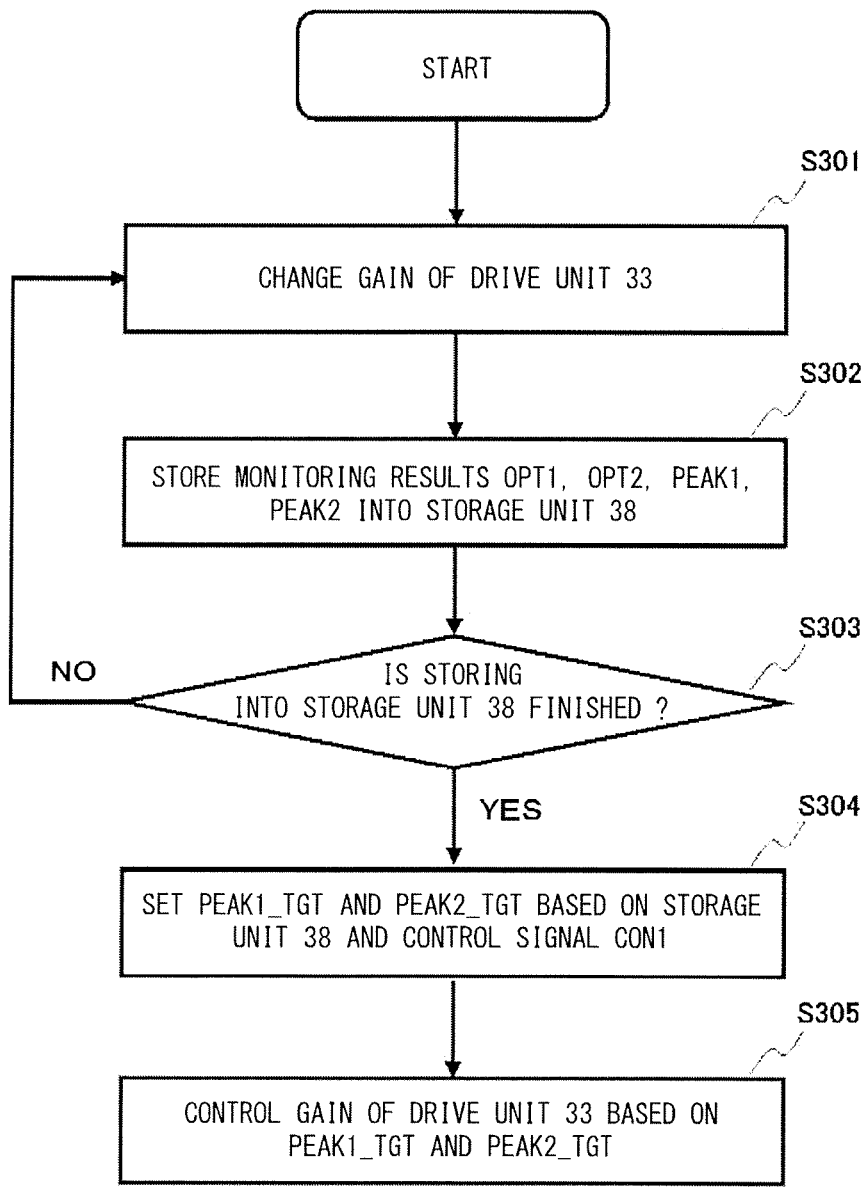
FIG. 12 is a flowchart showing an example of operations performed by a control unit according to the third example embodiment.

Operations in which the control unit 36 writes monitoring results into the storage unit 38 and controls the gain of the drive unit based on the control signal CON1 received from the optical transmission apparatus 92 and the memorized information held in the storage unit 38 will be described. FIG. 12 is a flowchart showing an example of operations performed by the control unit 36.

The control unit 36 changes the gain of the drive unit 33 according to a control signal CON2 (S301). For example, the control unit 36 may change the gain of the drive unit 33 by a predetermined value. Further, the control unit 36 may change the gain of the drive unit 33 with time.

The control unit 36 stores the monitoring results OPT1 and OPT2 received from the light-intensity monitor 35 and the monitoring results PEAK1 and PEAK2 received from the drive-signal monitor 37 into the storage unit 38 (S302). Note that as the gain of the drive unit 33 changes, the amplitudes of the drive signals SIG1 and SIG2 change. Therefore, the monitoring results PEAK1 and PEAK2 that change according to the changing gain are input from the drive-signal monitor 37 to the control unit 36. Further, as the amplitudes of the drive signals SIG1 and SIG2 change, the light intensities of the optical signals LS1 and LS2 also change. Therefore, the monitoring results OPT1 and OPT2 that change according to the changing gain are input from the light-intensity monitor 35 to the control unit 36. The control unit 36 stores the monitoring results OPT1 and PEAK1 while associating them with each other, and stores the monitoring results OPT2 and PEAK2 while associating them with each other. By doing so, the storage unit 38 can store the tables shown in FIG. 11 as the memorized information.

The control unit 36 determines whether or not the writing of the monitoring results into the storage unit 38 should be finished (S303). The writing of the monitoring results by the control unit 36 may be continued until the changing of the gain of the drive unit 33 is performed for a predetermined time, or may be continued until the changing of the monitoring results OPT1 and OPT2 ceases. When the writing is not finished (No), the control unit 36 returns to the step S301 and controls the gain of the drive unit 33 again.

When the writing is finished in the step S303 (Yes), the control unit 36 determines the target values PEAK1_TGT and PEAK2_TGT based on the memorized information stored in the storage unit 38 and the control signal CON1 received from the optical transmission apparatus 92 (S304).

Operations that the control unit 36 performs to determine the target values PEAK1_TGT and PEAK2_TGT will be described. As described in the second example embodiment, the control unit 36 may determine the target value OPT_TGT based on the control signal CON1, and may set the monitoring results PEAK1 and PEAK2 corresponding to the target value OPT_TGT as the target values PEAK1_TGT and PEAK2_TGT. Note that the control signal CON1 may contain information for specifying the value(s) of the driving amplitude(s). For example, the control signal CON1 may contain information for specifying the amplitude of the drive signal by using a ratio to the drive signal by which the phase of the light is changed by 180°, which is defined as 100%, in the modulation curve. In this case, firstly, the control unit 36 determines the target value OPT_TGT based on the value of the driving amplitude specified by the control signal CON1. As this determination method, the storage unit 38 may store the light intensity corresponding to the value of the driving amplitude specified by the control signal CON1 as memorized information, and the control unit 36 may determine the target value OPT_TGT by referring to this memorized information.

As another determination method, the control unit 36 may determine the value of the driving amplitude specified by the control signal CON1 as the target values PEAK1_TGT, and then refer to the storage unit 38 and define the monitoring result OPT1 corresponding to the monitoring result PEAK1 indicating the target value PEAK1_TGT as the target value OPT_TGT. Next, the control unit 36 determines the value of the monitoring result PEAK2 corresponding to the monitoring result OPT2 indicating the target value OPT_TGT as the target value PEAK2_TGT.

After setting the target values PEAK1_TGT and PEAK2_TGT, the control unit 36 controls the gain of the drive unit 33 (S305). This operation is similar to that described above in the second example embodiment and hence the detailed description thereof is omitted.

The pluggable optical module according to this example embodiment stores monitoring results of intensities of optical signals and those of amplitudes of drive signals while associating them with each other. Further, the pluggable optical module adjusts the difference between the intensities of the optical signals by adjusting the gain based on the memorized results. Since the difference between light intensities is eliminated by controlling the gain, the signal quality can be improved.

The pluggable optical module according to this example embodiment sets target values for the amplitudes of the drive signals based on the control signal and the memorized information, and controls the gain of the drive unit. Further, the pluggable optical module sets target values of the amplitudes of the drive signals from information specified by the control signal based on the memorized information containing internal monitoring results. Therefore, when the difference between light intensities is adjusted by the optical transmission apparatus, there is no need to set information specified by the control signal while taking an individual difference of each optical modulator provided in the pluggable optical module into consideration.

Fourth Example Embodiment

Configuration

A fourth example embodiment according to the present invention will be described. A pluggable optical module according to the fourth example embodiment of the present invention can change the wavelength of an optical signal to be output. Further, the pluggable optical module is characterized in that it adjusts the driving amplitude of a drive signal according to the change in the wavelength of the optical signal.

Figure 13:
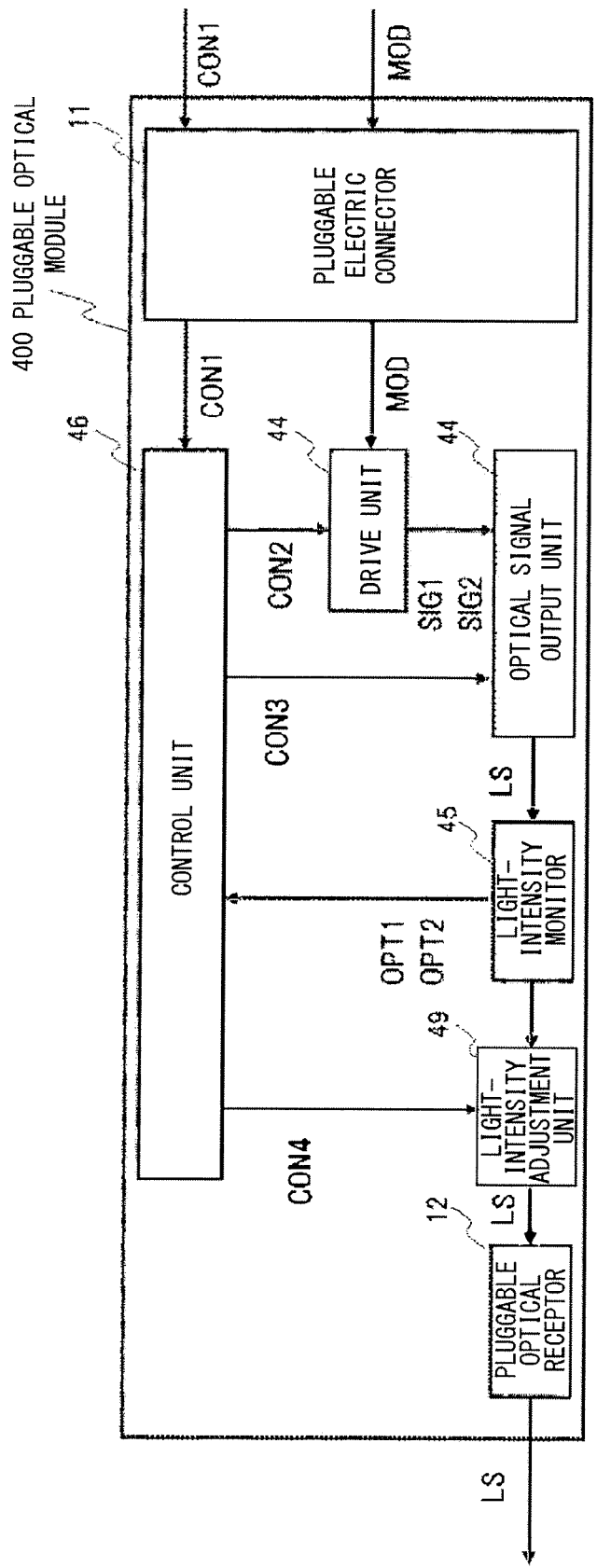
FIG. 13 shows an example of a configuration of a pluggable optical module according to a fourth example embodiment.

FIG. 13 shows an example of a configuration of a pluggable optical module 400 according to the fourth example embodiment of the present invention. Note that in the fourth example embodiment according to the present invention, descriptions of components/structures similar to those in the other example embodiments according to the present invention are omitted.

Figure 14:
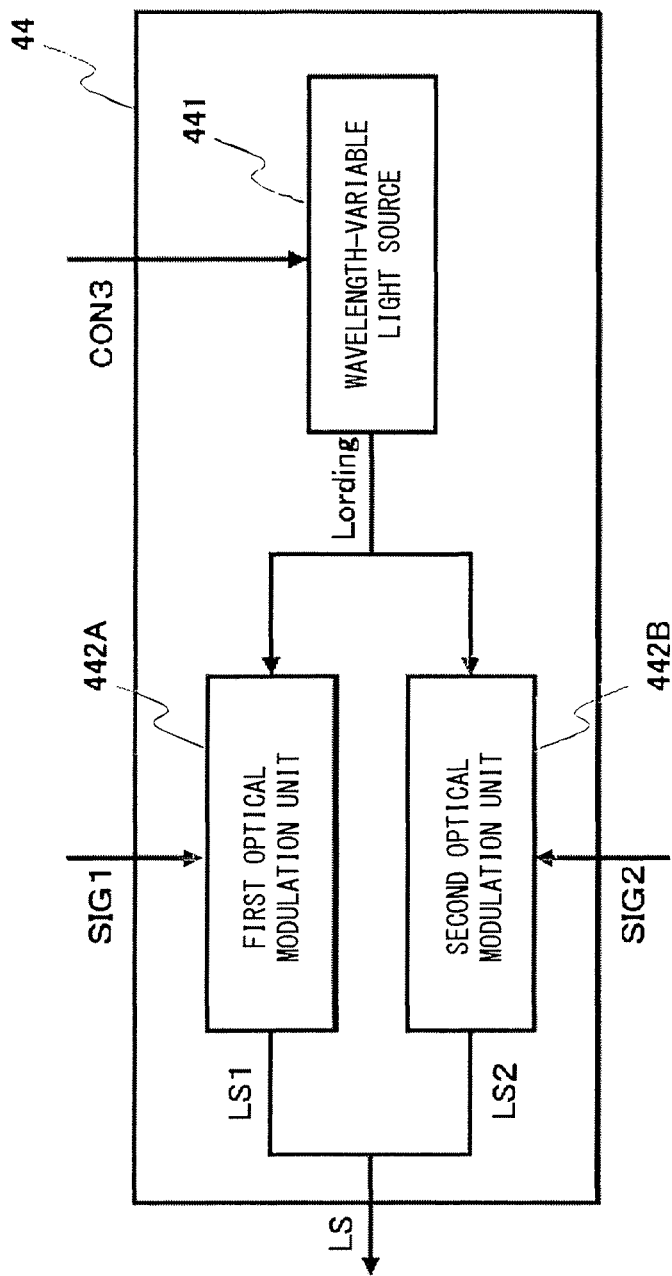
FIG. 14 shows an example of a configuration of an optical signal output unit according to the fourth example embodiment.

An optical signal output unit 44 has a configuration by which it can change the wavelength of an optical signal to be output. FIG. 14 shows an example of the configuration of the optical signal output unit 44. The optical signal output unit 44 includes a wavelength-variable light source 441.

The wavelength-variable light source 441 is composed of, for example, a semiconductor laser and wavelength-variable means such as a ring resonator, and outputs output light "Lording". The wavelength of the output light "Lording" is controlled by a control signal CON3 sent from a control unit 46.

A light-intensity adjustment unit 49 can adjust the light intensity of multiplexed light of optical signals LS1 and LS2 output from the optical signal output unit 44 by attenuating or blocking the multiplexed light. Further, the light-intensity adjustment unit 49 adjusts the light intensity of the multiplexed light according to a control signal CON4 sent from the control unit 46. The light-intensity adjustment unit 49 may use, for example, an attenuator or a shutter.

As described above, the control unit 46 can control the wavelength-variable light source 441 by using the control signal CON3, and can control the light-intensity adjustment unit 49 by using the control signal CON4. Further, the control unit 46 changes the wavelength of the optical signal by controlling the wavelength-variable light source 441, and adjusts the difference between the intensities of the optical signals LS1 and LS2 according to the change in the wavelength of the optical signal.

Figure 15:
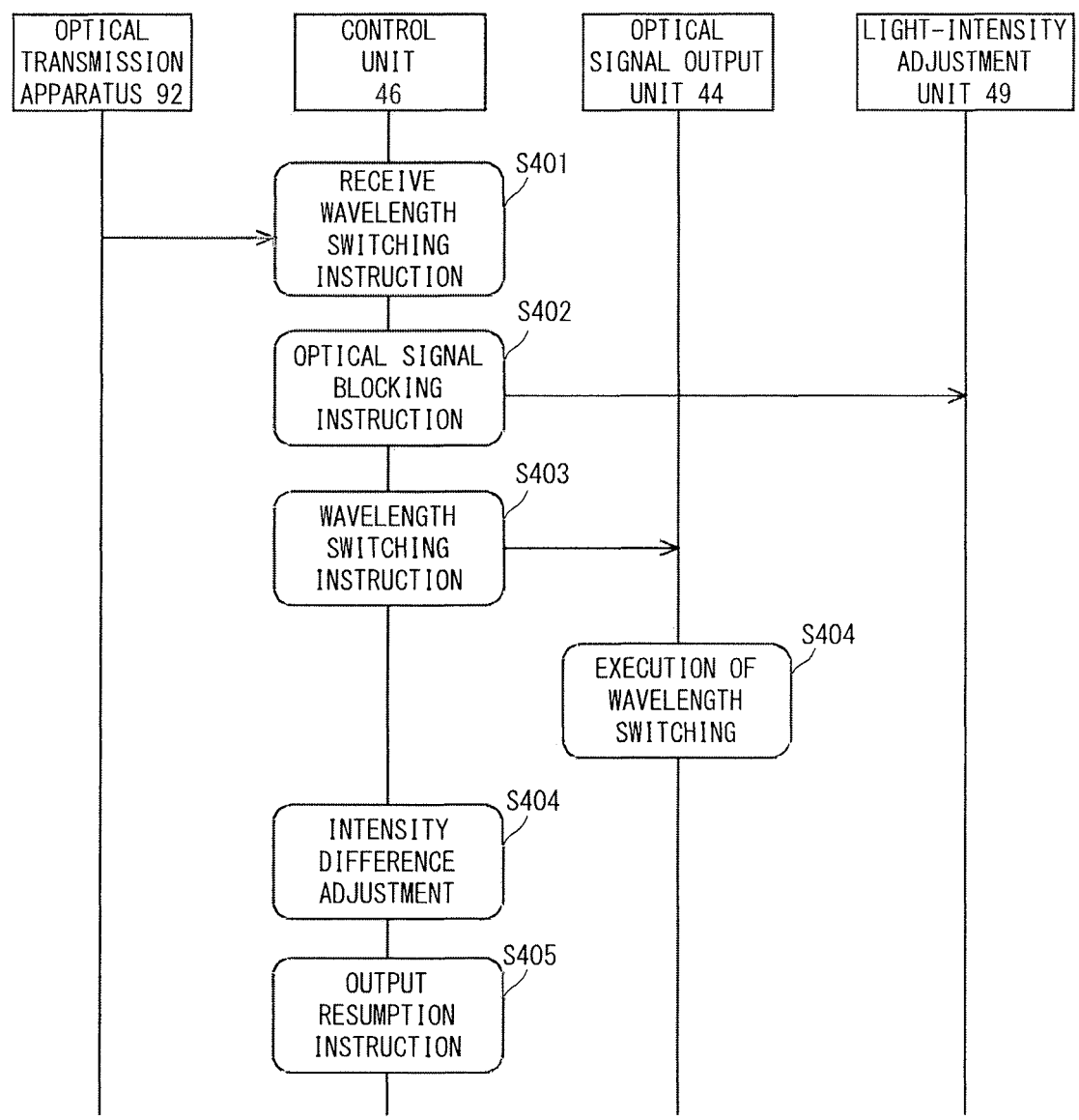
FIG. 15 is a sequence diagram showing an example of operations performed by each component of the pluggable optical module according to the fourth example embodiment.

The adjustment of the difference between the intensities of the optical signals LS1 and LS2 according to the change in the wavelength of the optical signal will be described. FIG. 15 is a sequence diagram showing an example of operations performed by each component of the pluggable optical module 400.

For example, in a state in which the wavelength-variable light source 441 is outputting output light "Lording" having a wavelength λ1, the control unit 46 receives a wavelength switching instruction from the optical transmission apparatus 92 (S401). The wavelength switching instruction is contained in the control signal CON1 sent from the optical transmission apparatus 92.

In response to the wavelength switching instruction, the control unit 46 instructs the light-intensity adjustment unit to shut off the output of the optical signal (S402). Specifically, the control unit 46 instructs the light-intensity adjustment unit 49 to block the multiplexed light output from the optical signal output unit 44 according to the control signal CON4.

In response to the wavelength switching instruction, the control unit 46 instructs the optical signal output unit 44 to switch the wavelength of the output light "Lording" from the wavelength λ1 to a different wavelength λ2 (S403).

The optical signal output unit 44 switches the wavelength of the output light "Lording" from the wavelength λ1 to the wavelength λ2 (S404). The optical signal output unit 44 may perform the process for switching the wavelength from the wavelength λ1 to the wavelength λ2 after stopping the output of the output light "Lording" from the wavelength-variable light source 441.

Although not shown in the drawings, the control unit 46 may adjust a bias voltage in response to the switching of the wavelength performed in the steps S403 and S404.

The control unit 46 adjusts the difference between the intensities of the optical signals LS1 and LS2 after the completion of the wavelength switching (S405). This operation is similar to the operation for adjusting the difference between the intensities of the optical signals LS1 and LS2 in the above-described example embodiment, and hence the detailed description thereof will be omitted.

After completing the adjustment of the difference between the intensities of the optical signals LS1 and LS2, the control unit 46 instructs the light-intensity adjustment unit 49 to resume the output (S406). Specifically, the control unit 46 controls the light-intensity adjustment unit 49 so as to adjust the light intensity of the multiplexed light of the optical signals LS1 and LS2 to a predetermined light intensity. As a result, the optical signals LS1 and LS2, which are obtained by modulating the output light "Lording" having the wavelength λ2, are output to the optical fiber 91.

The pluggable optical module according to this example embodiment adjusts the difference between the intensities of the optical signals in response to the switching of the wavelength of the optical signal which the pluggable optical module has performed according to the instruction from the optical transmission apparatus 92. In this way, the difference between the light intensities is eliminated even after the switching of the wavelength, so that the signal quality can be improved.

Fifth Example Embodiment

In the above-described example embodiments, the pluggable optical module is configured so that it can adjust the difference between the light intensities of the two optical signals LS1 and LS2. However, the number of optical signals of which the difference between the light intensities can be adjusted is not limited to two. For example, a pluggable optical module according to a fifth example embodiment of the present invention can adjust the differences among intensities of four optical signals.

Figure 16:
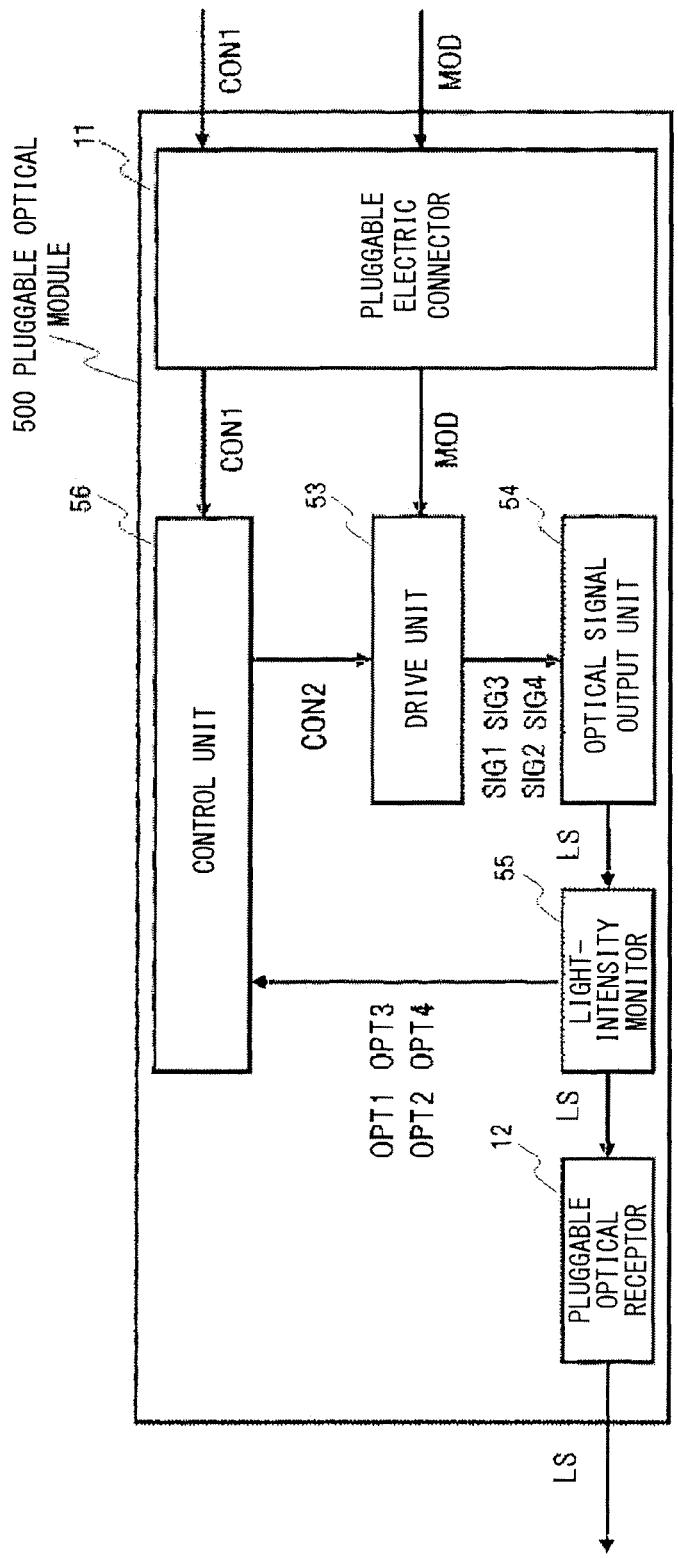
FIG. 16 shows an example of a configuration of a pluggable optical module in a fifth example embodiment.

FIG. 16 shows an example of a configuration of a pluggable optical module 500 according to the fifth example embodiment. Note that in the fifth example embodiment according to the present invention, descriptions of components/structures similar to those in the other example embodiments according to the present invention are omitted. Further, the configuration of the pluggable optical module 500 is not limited to this example. That is, the pluggable optical module 500 may be configured so as to include a component(s) corresponding to the drive-signal monitor 27 and/or the storage unit 38.

Figure 17:
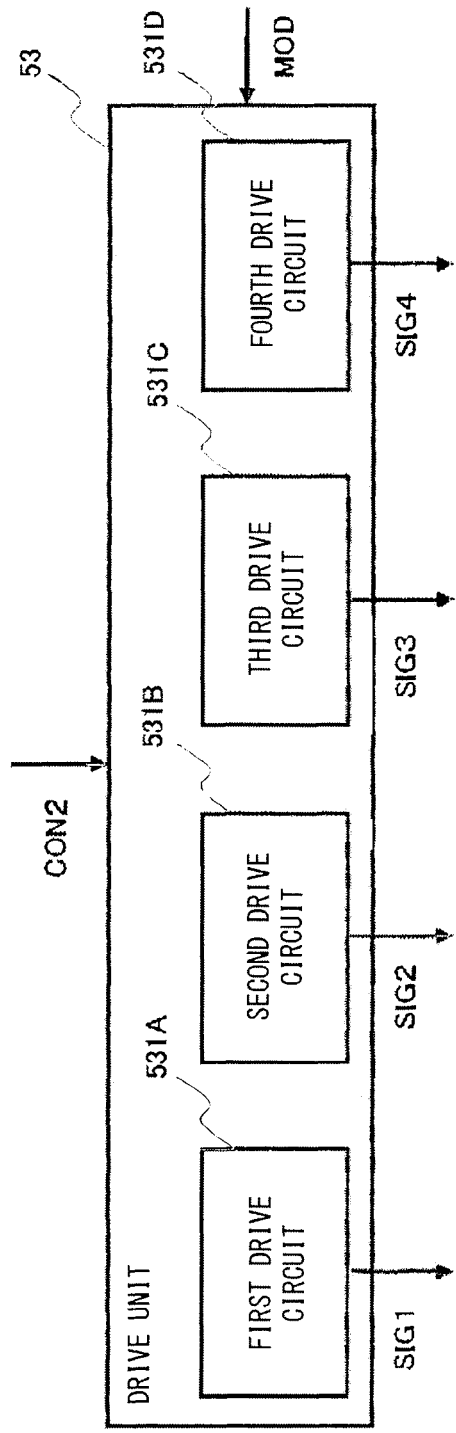
FIG. 17 shows an example of a configuration of a drive unit according to the fifth example embodiment.

A drive unit 53 has a function of outputting drive signals SIG1, SIG2, SIG3 and SIG4 according to a modulation signal MOD, which has been received from the optical transmission apparatus 92 through a pluggable electric connector 11, to an optical signal output unit 54. FIG. 17 shows an example of a configuration of the drive unit 53. The drive unit 53 includes a drive circuit 531A that outputs a drive signal SIG1, a second drive circuit 531B that outputs a drive signal SIG2, a third drive circuit 531C that outputs a drive signal SIG3, and a fourth drive circuit 531D that outputs a drive signal SIG4. Note that the drive signals SIG1, SIG2, SIG3 and SIG4 are signals each of which has a signal component conforming to a modulation method. The drive unit 53 is configured so that it can adjust the gain by which the modulation signal MOD is amplified. The detailed description of the drive unit 53 is similar to that in the other example embodiments and hence is omitted.

The optical signal output unit 54 outputs optical signals LS1, LS2, LS3 and LS4 that have been modulated according to the drive signals SIG1, SIG2, SIG3 and SIG4 output from the drive unit 53. Note that the optical signal LS1 is an optical signal modulated according to the drive signal SIG1 received from the drive unit 53, and the optical signal LS2 is an optical signal modulated according to the drive signal SIG2 received from the drive unit 53. Further, the optical signal LS3 is an optical signal modulated according to the drive signal SIG3 received from the drive unit 53, and the optical signal LS4 is an optical signal modulated according to the drive signal SIG4 received from the drive unit 53.

Figure 18:
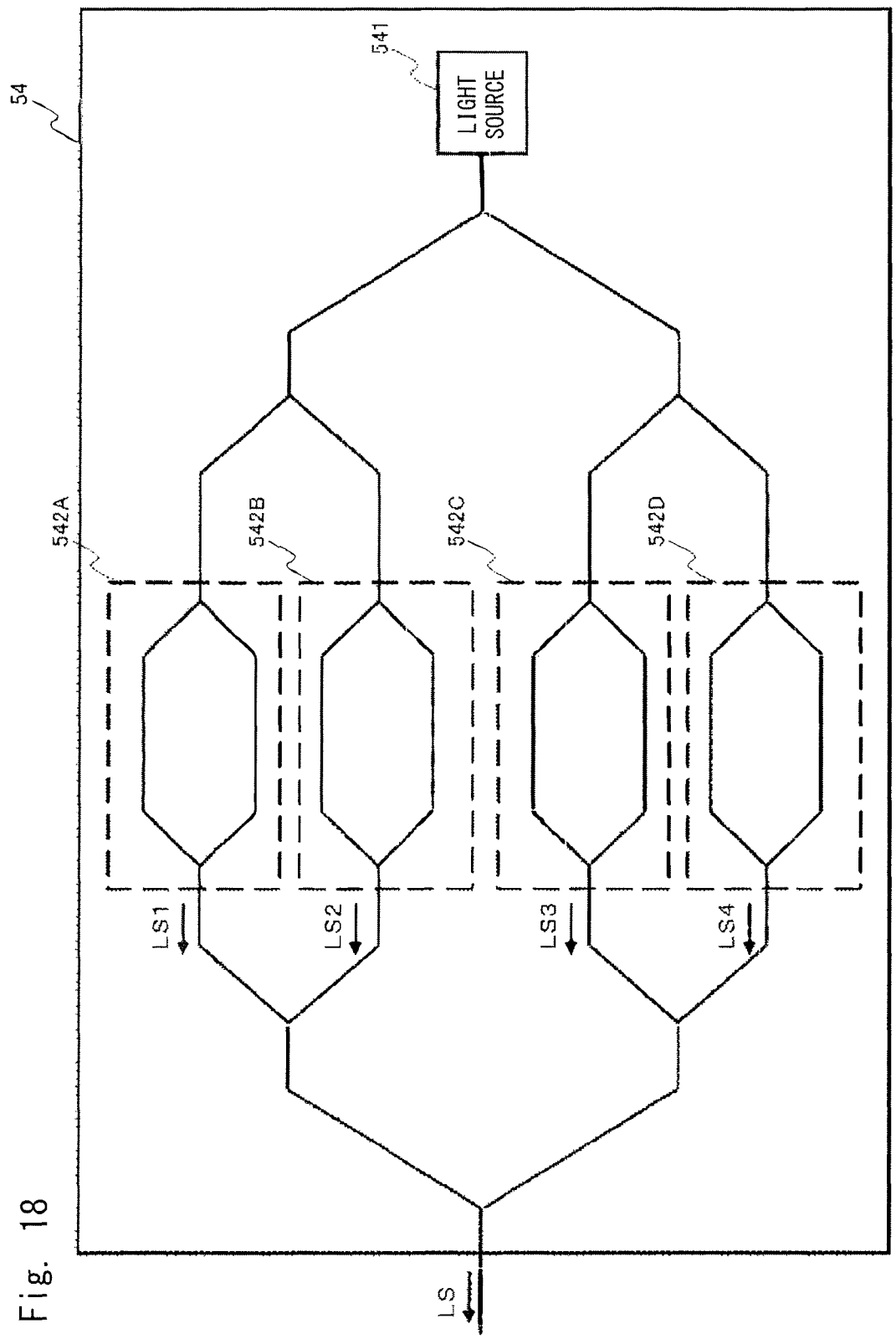
FIG. 18 shows an example of a configuration of an optical signal output unit according to the fifth example embodiment.

FIG. 18 shows an example of a configuration of the optical signal output unit 54. The optical signal output unit 54 includes a first optical modulation unit 542A, a second optical modulation unit 542B, a third optical modulation unit 542C, and a fourth optical modulation unit 542D. When the optical modulation units are not distinguished from each other, they are referred to as optical modulation units 542.

Each of the optical modulation units 542 is composed of a Mach-Zehnder type optical modulator, and outputs an optical signal modulated by a predetermined modulation method. Note that the Mach-Zehnder type optical modulator may be a semiconductor optical modulator. Further, the optical modulation units 542A, 542B, 542C and 542D may be provided as Inner Mach-Zehnder type optical modulators, and the Mach-Zehnder type optical modulator with the optical modulation units 542A and 542B disposed on its arms and the Mach-Zehnder type optical modulator with the optical modulation units 542C and 542D disposed on its arms may be provided as Outer Mach-Zehnder type optical modulators.

Note that when the optical signal output unit 54 is configured so that it can output an optical signal modulated by an optical modulation method such as a QPSK method or a 16 QAM method, the optical modulation units 542A and 542C are provided as optical modulation units that output signals corresponding to the I-axis component of the constellation, and the optical modulation units 542B and 542D are provided as optical modulation units that output signals corresponding to the Q-axis component of the constellation. Further, when the optical signal output unit 54 is configured so that it can output an optical signal modulated by the polarization modulation method, the optical modulation units 542A and 542B output X-polarized optical signals, and the optical modulation units 542C and 542D output Y-polarized optical signals.

A light-intensity monitor 55 monitors the intensities of the optical signals LS1, LS2, LS3 and LS4 output from the optical signal output unit 54. Further, the light-intensity monitor 55 outputs a monitoring result OPT1 of the optical signal LS1, a monitoring result OPT2 of the optical signal LS2, a monitoring result OPT3 of the optical signal LS3, and a monitoring result OPT4 of the optical signal LS4 to the control unit 56. Note that the light-intensity monitor 55 may be formed as a TAP photodiode.

Figure 19:
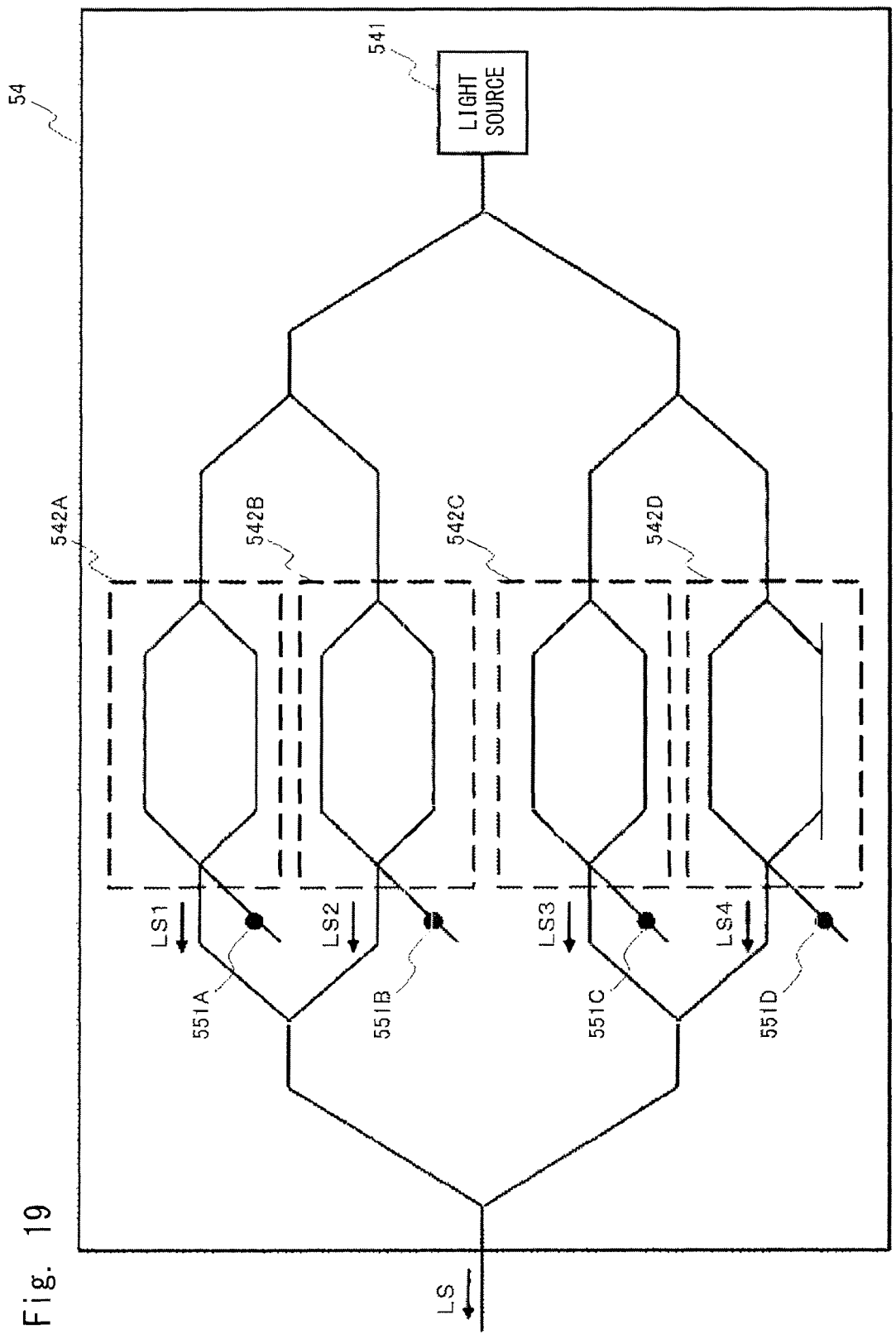
FIG. 19 shows an example of a configuration of a light-intensity monitor according to the fifth example embodiment.

The place where the light-intensity monitor 55 is disposed is not limited to the place where the multiplexed light transmitted from the optical signal output unit 54 is input. FIG. 19 shows an example of a configuration of the light-intensity monitor 55. The light-intensity monitor 55 shown in FIG. 19 includes a first light-intensity monitor 551A, a second light-intensity monitor 551B, a third light-intensity monitor 551C, and a fourth light-intensity monitor 551D. Further, the light-intensity monitors 551A to 551D are provided as TAP photodiodes on the optical waveguides of the Mach-Zehnder type optical modulators. The light-intensity monitors 551A to 551D are respectively disposed at places where the optical signals LS1 to LS4 sent from the respective light modulators 542A to 542D are input. Further, the light-intensity monitors 551A to 551D output the monitoring results OPT1 to OPT4 to the control unit 56.

The control unit 56 controls the gain of the drive unit 53 so as to adjust the differences among the light intensities of the optical signals LS1 to LS4. The control described in the previously-described example embodiments is applied to the control of the gain of the drive unit 53 performed by the control unit 56. The control unit 56 adjusts the gain of the drive unit 53 so that the differences among the intensities of the optical signal LS1 to LS4 decrease.

The pluggable optical module according to this example embodiment is configured so that it can output four optical signals, and adjusts the differences among the light intensities of these optical signals. In this way, even when there are more than two optical signals, the differences among the light intensities are eliminated, so that the signal quality can be improved.

Although the present invention is explained above with reference to example embodiments, the present invention is not limited to the above-described example embodiments. Various modifications that can be understood by those skilled in the art can be made to the configuration and details of the present invention within the scope of the invention.

Supplementary Note 1

A pluggable optical module comprising:
a pluggable electric connector configured so as to be insertable into and removable from an optical transmission apparatus, and capable of transmitting/receiving a data signal to/from the optical transmission apparatus;
drive means for outputting first and second driving signals by amplifying the data signal;
optical signal output means for outputting a first optical signal modulated according to the first drive signal and a second optical signal modulated according to the second drive signal;
light-intensity monitoring means for monitoring intensities of the first and second optical signals;
control means for controlling a gain of the drive means so as to adjust a difference between the intensities of the first and second optical signals based on a result of the monitoring by the light-intensity monitoring means; and
a pluggable optical receptor configured so that an optical fiber can be inserted thereinto and removed therefrom, and configured to output the first and second optical signals.

Supplementary Note 2

The pluggable optical module described in Supplementary note 1, further comprising drive-signal monitoring means for monitoring amplitudes of the first and second drive signals, wherein
the control means controls the gain of the drive means based on a result of the monitoring by the drive-signal monitoring means.

Supplementary Note 3

The pluggable optical module described in Supplementary note 2, wherein the control means sets first and second target values, and controls the gain of the drive means so that the amplitude of the first drive signal becomes equal to the first target value and the amplitude of the second drive signal becomes equal to the second target value.

Supplementary Note 4

The pluggable optical module described in Supplementary note 3, further comprising storage means for storing the results of the monitoring by the light-intensity monitoring means and the drive-signal monitoring means, wherein the control means sets the first and second target values by referring to the storage means and a control signal received from the optical transmission apparatus.

Supplementary Note 5

The pluggable optical module described in Supplementary note 4, wherein the control signal contains amplitude information for specifying the amplitude of the drive signal, and the control means sets the first and second target values based on the amplitude information.

Supplementary Note 6

The pluggable optical module described in any one of Supplementary notes 1 to 5, further comprising light-intensity adjustment means capable of adjusting light intensities of the first and second optical signals output from the optical signal output means, wherein the light-intensity adjustment means shuts off outputs of the first and second optical signals when a wavelength switching instruction is input from the optical transmission apparatus to the control means, the optical signal output means switches wavelengths of the first and second optical signals after shutting off the outputs, and the control means controls the gain of the drive means so as to adjust the difference between the intensities of the first and second optical signals after the switching of the wavelength.

Supplementary Note 7

The pluggable optical module described in any one of Supplementary notes 1 to 5, wherein the drive means outputs third and fourth drive signals by amplifying the data signal, the optical signal output means outputs a third optical signal modulated according to the third drive signal and a fourth optical signal modulated according to the fourth drive signal, the light-intensity monitoring means monitors intensities of the third and fourth optical signals, and the control means controls the gain of the drive means so as to adjust differences among the intensities of the first, second, third and fourth optical signals based on a result of the monitoring by the light-intensity monitoring means.

Supplementary Note 8

The pluggable optical module described in any one of Supplementary notes 1 to 6, wherein: the optical signal output means outputs a quadrature modulation signal; the first optical signal is an I-signal; and the second optical signal is a Q-signal.

Supplementary Note 9

The pluggable optical module described in Supplementary note 7, wherein: the optical signal output means outputs a polarization-multiplexed signal; the first and second optical signals are X-polarized signals; and the third and fourth optical signals are Y-polarized signals.

Supplementary Note 10

An optical communication system comprising:

an optical fiber configured to transmit an optical signal;

a pluggable optical module configured so that the optical fiber can be inserted thereinto and removed therefrom, and configured to output the optical signal to the optical fiber; and an optical transmission apparatus configured so that the pluggable optical module can be inserted thereinto and removed therefrom, and configured to control the pluggable optical module, wherein the pluggable optical module comprises:

a pluggable electric connector configured so as to be insertable into and removable from an optical transmission apparatus, and capable of transmitting/receiving a data signal to/from the optical transmission apparatus;

drive means for outputting first and second driving signals by amplifying the data signal;

optical signal output means for outputting a first optical signal modulated according to the first drive signal and a second optical signal modulated according to the second drive signal;

light-intensity monitoring means for monitoring intensities of the first and second optical signals;

control means for controlling a gain of the drive means so as to adjust a difference between the intensities of the first and second optical signals based on a result of the monitoring by the light-intensity monitoring means; and a pluggable optical receptor configured so that an optical fiber can be inserted thereinto and removed therefrom, and configured to output the first and second optical signals.

Supplementary Note 11

A method for controlling a pluggable optical module, comprising:

transmitting/receiving a data signal to/from an optical transmission apparatus through a pluggable electric connector, the pluggable electric connector being configured so as to be insertable into and removable from the optical transmission apparatus;

outputting first and second driving signals by amplifying the data signal;

outputting a first optical signal modulated according to the first drive signal and a second optical signal modulated according to the second drive signal;

outputting a result of monitoring of intensities of the first and second optical signals;

controlling an amplification gain of the data signal so as to adjust a difference between the intensities of the first and second optical signals based on the result of the monitoring; and outputting the first and second optical signals through a pluggable optical receptor, the pluggable optical receptor being configured so that an optical fiber can be inserted thereinto and removed therefrom.

This application is based upon and claims the benefit of priority from Japanese patent application No. 2018-060527, filed on Mar. 27, 2018, the disclosure of which is incorporated herein in its entirety by reference.

REFERENCE SIGNS LIST

11 PLUGGABLE ELECTRIC CONNECTOR
12 PLUGGABLE OPTICAL RECEPTOR
13, 23, 33, 43, 53 DRIVE UNIT
14, 24, 34, 44, 54 OPTICAL SIGNAL OUTPUT UNIT
15, 25, 35, 45, 55 LIGHT-INTENSITY MONITOR
16, 26, 36, 46, 56 CONTROL UNIT
27, 37 DRIVE-SIGNAL MONITOR
38 STORAGE UNIT
49 LIGHT-INTENSITY CONTROL UNIT
91 OPTICAL FIBER
92 OPTICAL TRANSMISSION APPARATUS
100, 200, 300, 400, 500 PLUGGABLE OPTICAL MODULE
131 DRIVE CIRCUIT
141, 541 LIGHT SOURCE
142, 442, 542 OPTICAL MODULATION UNIT
151, 551 LIGHT-INTENSITY MONITOR
441 WAVELENGTH-VARIABLE LIGHT SOURCE
531 DRIVE CIRCUIT

The invention claimed is:

1. A pluggable optical module comprising:
a pluggable electric connector configured so as to be insertable into and removable from an optical transmission apparatus, and capable of transmitting/receiving a data signal to/from the optical transmission apparatus;
drive unit for outputting first and second driving signals by amplifying the data signal;
optical signal output unit for outputting a first optical signal modulated according to the first drive signal and a second optical signal modulated according to the second drive signal;
light-intensity monitoring unit for monitoring intensities of the first and second optical signals;
control unit for controlling a gain of the drive unit so as to adjust a difference between the intensities of the first and second optical signals based on a result of the monitoring by the light-intensity monitoring unit; and
a pluggable optical receptor configured so that an optical fiber can be inserted thereinto and removed therefrom, and configured to output the first and second optical signals.

2. The pluggable optical module according to claim 1, further comprising drive-signal monitoring unit for monitoring amplitudes of the first and second drive signals, wherein
the control unit controls the gain of the drive unit based on a result of the monitoring by the drive-signal monitoring unit.

3. The pluggable optical module according to claim 2, wherein the control unit sets first and second target values, and controls the gain of the drive unit so that the amplitude of the first drive signal becomes equal to the first target value and the amplitude of the second drive signal becomes equal to the second target value.

4. The pluggable optical module according to claim 3, further comprising storage unit for storing the results of the monitoring by the light-intensity monitoring unit and the drive-signal monitoring unit, wherein
the control unit sets the first and second target values by referring to the storage unit and a control signal received from the optical transmission apparatus.

5. The pluggable optical module according to claim 4, wherein
the control signal contains amplitude information for specifying the amplitude of the drive signal, and
the control unit sets the first and second target values based on the amplitude information.

6. The pluggable optical module according to claim 1, further comprising light-intensity adjustment unit capable of adjusting light intensities of the first and second optical signals output from the optical signal output unit, wherein
the light-intensity adjustment unit shuts off outputs of the first and second optical signals when a wavelength switching instruction is input from the optical transmission apparatus to the control unit,
the optical signal output unit switches wavelengths of the first and second optical signals after shutting off the outputs, and
the control unit controls the gain of the drive unit so as to adjust the difference between the intensities of the first and second optical signals after the switching of the wavelength.

7. The pluggable optical module according to claim 1, wherein
the drive unit outputs third and fourth drive signals by amplifying the data signal,
the optical signal output unit outputs a third optical signal modulated according to the third drive signal and a fourth optical signal modulated according to the fourth drive signal,
the light-intensity monitoring unit monitors intensities of the third and fourth optical signals, and
the control unit controls the gain of the drive unit so as to adjust differences among the intensities of the first, second, third and fourth optical signals based on a result of the monitoring by the light-intensity monitoring unit.

8. The pluggable optical module according to claim 1, wherein: the optical signal output unit outputs a quadrature modulation signal; the first optical signal is an I-signal; and the second optical signal is a Q-signal.

9. The pluggable optical module according to claim 7, wherein: the optical signal output unit outputs a polarization-multiplexed signal; the first and second optical signals are X-polarized signals; and the third and fourth optical signals are Y-polarized signals.

10. An optical communication system comprising:
an optical fiber configured to transmit an optical signal;
a pluggable optical module configured so that the optical fiber can be inserted thereinto and removed therefrom, and configured to output the optical signal to the optical fiber; and
an optical transmission apparatus configured so that the pluggable optical module can be inserted thereinto and removed therefrom, and configured to control the pluggable optical module, wherein
the pluggable optical module comprises:
a pluggable electric connector configured so as to be insertable into and removable from an optical transmission apparatus, and capable of transmitting/receiving a data signal to/from the optical transmission apparatus;
drive unit for outputting first and second driving signals by amplifying the data signal;
optical signal output means for outputting a first optical signal modulated according to the first drive signal and a second optical signal modulated according to the second drive signal;

light-intensity monitoring unit for monitoring intensities of the first and second optical signals;

control unit for controlling a gain of the drive unit so as to adjust a difference between the intensities of the first and second optical signals based on a result of the monitoring by the light-intensity monitoring unit; and a pluggable optical receptor configured so that an optical fiber can be inserted thereinto and removed therefrom, and configured to output the first and second optical signals.

11. A method for controlling a pluggable optical module, comprising:

transmitting/receiving a data signal to/from an optical transmission apparatus through a pluggable electric connector, the pluggable electric connector being configured so as to be insertable into and removable from the optical transmission apparatus;

outputting first and second driving signals by amplifying the data signal;

outputting a first optical signal modulated according to the first drive signal and a second optical signal modulated according to the second drive signal;

outputting a result of monitoring of intensities of the first and second optical signals;

controlling an amplification gain of the data signal so as to adjust a difference between the intensities of the first and second optical signals based on the result of the monitoring; and outputting the first and second optical signals through a pluggable optical receptor, the pluggable optical receptor being configured so that an optical fiber can be inserted thereinto and removed therefrom.

* * * * *